United States Patent
Huang

(10) Patent No.: US 12,170,957 B2
(45) Date of Patent: Dec. 17, 2024

(54) DEVICE WAKE-UP METHOD, APPARATUS, AND SYSTEM, AND NIGHT WATCH DEVICE DETERMINING METHOD AND APPARATUS

(71) Applicant: Huawei Technologies Co., Ltd., Shenzhen (CN)

(72) Inventor: Zhengquan Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 260 days.

(21) Appl. No.: 17/671,985

(22) Filed: Feb. 15, 2022

(65) Prior Publication Data

US 2022/0174590 A1 Jun. 2, 2022

Related U.S. Application Data

(63) Continuation of application No. PCT/CN2020/108624, filed on Aug. 12, 2020.

(30) Foreign Application Priority Data

Aug. 16, 2019 (CN) .......................... 201910759857.4

(51) Int. Cl.
*H04W 52/02* (2009.01)
(52) U.S. Cl.
CPC ... *H04W 52/0206* (2013.01); *H04W 52/0216* (2013.01); *H04W 52/0229* (2013.01)
(58) Field of Classification Search
None
See application file for complete search history.

(56) References Cited

U.S. PATENT DOCUMENTS

| 10,104,614 | B2 | 10/2018 | Xing |
| 2013/0145191 | A1 | 6/2013 | Hung et al. |
| 2015/0146598 | A1 | 5/2015 | Cheong et al. |
| 2017/0238401 | A1* | 8/2017 | Sadwick ............. A61N 5/0618 315/294 |
| 2019/0072638 | A1* | 3/2019 | Wang .................... H04W 4/029 |

FOREIGN PATENT DOCUMENTS

| CN | 105309012 A | 2/2001 |
| CN | 101155355 A | 4/2008 |
| CN | 101541068 A | 9/2009 |

(Continued)

*Primary Examiner* — Hong Shao
(74) *Attorney, Agent, or Firm* — Slater Matsil, LLP

(57) ABSTRACT

A device wake-up method, including sending, by a night watch device, in response to the night watch device receiving a wireless packet sent by a terminal, a wake-up notification to a nursing device managed by the night watch device, where the night watch device implements a night watch function, where a wireless network including a plurality of night watch devices that includes the nigh tight watch device, and the wireless network further includes a plurality of nursing devices that includes the nursing device, where each night watch device of the plurality of night watch devices is configured to manage one or more nursing devices of the plurality of nursing devices, and, when no terminal is connected to the wireless network, the night watch device is in a shallow sleep state or a wake-up state and the nursing device is in a deep sleep state.

18 Claims, 12 Drawing Sheets

(56) References Cited

FOREIGN PATENT DOCUMENTS

| | | |
|---|---|---|
| CN | 101626613 A | 1/2010 |
| CN | 102523020 A | 6/2012 |
| CN | 104469915 A | 3/2015 |
| CN | 108401280 A | 8/2018 |
| CN | 109617704 A | 4/2019 |
| EP | 2453706 B1 | 7/2013 |
| WO | 2017044456 A1 | 3/2017 |

* cited by examiner

DEVICE WAKE-UP METHOD, APPARATUS, AND SYSTEM, AND NIGHT WATCH DEVICE DETERMINING METHOD AND APPARATUS

CROSS-REFERENCE TO RELATED APPLICATIONS

This application is a continuation of International Application No. PCT/CN2020/108624, filed on Aug. 12, 2020, which claims priority to Chinese Patent Application No. 201910759857.4, filed on Aug. 16, 2019. The disclosures of the aforementioned applications are hereby incorporated by reference in their entireties.

TECHNICAL FIELD

This application relates to the field of wireless technologies, and in particular, to a device wake-up method, apparatus, and system, and a night watch device determining method and apparatus.

BACKGROUND

With continuous expansion of a network scale, energy consumption of devices in a network keeps increasing. At present, a plurality of network energy saving technologies are proposed, to reduce energy consumption of the devices in the network. Common network energy saving technologies include intelligent fan speed adjustment, automatic laser shutdown (ALS), energy efficient Ethernet (EEE), port dormancy, redundant power supply shutdown, and the like.

Most of current network energy saving technologies are device-level energy saving technologies, and a device independently enters a sleep state or a wake-up state. That the device is in the sleep state means that a component of the device is in an energy saving mode, and that the device is in the wake-up state means that all components of the device are in a normal working mode. The EEE energy saving technology is used as an example. The EEE is an energy saving method that dynamically adjusts power of an electrical interface based on network traffic. For a device configured with an electrical interface that can automatically adjust power, when the interface is in a service idle state (that is, no network traffic is transmitted through the interface), the device reduces power supply to the interface. In other words, the interface of the device automatically enters the energy saving mode. When network traffic is transmitted through the interface, the device restores the power supply to the interface. In other words, the interface of the device automatically enters the normal working mode.

Currently, the sleep state of the device can be classified into a deep sleep state and a shallow sleep state. That the device is in the deep sleep state means that most components of the device are in the energy saving mode. In this case, an energy saving degree of the device is high. That the device is in the shallow sleep state means that a few components of the device are in the energy saving mode. In this case, an energy saving degree of the device is low.

Although a relatively good energy saving effect can be achieved because the most components of the device in the deep sleep state are in the energy saving mode, when the device needs to enter the normal working mode, the device may not be woken up promptly or even cannot be woken up autonomously. Therefore, the current network energy saving technologies may not balance device energy saving and timely wake-up.

SUMMARY

This application provides a device wake-up method, apparatus, and system, and a night watch device determining method and apparatus, to resolve a problem that current network energy saving technologies may not balance device energy saving and timely wake-up.

According to a first aspect, a device wake-up method is provided, and the method is applied to a wireless network. The wireless network includes a plurality of night watch devices and a plurality of nursing devices. Each of the plurality of night watch devices is configured to manage one or more of the nursing devices. When no terminal is connected to the wireless network, the night watch device is in a shallow sleep state or a wake-up state, and the nursing device is in a deep sleep state. When the night watch device that enables a night watch function receives a wireless packet sent by a terminal, the night watch device sends a wake-up notification to the nursing device managed by the night watch device.

In this application, the night watch device is disposed in the wireless network. When no terminal is connected to the wireless network, the night watch device is in the shallow sleep state or the wake-up state, and the nursing device is in the deep sleep state. Therefore, a relatively good energy saving effect of the wireless network is achieved. In addition, the night watch device in the shallow sleep state or the wake-up state may listen to the wireless packet of the terminal. When receiving the wireless packet sent by the terminal, the night watch device wakes up the nursing device in the deep sleep state through the wake-up notification, so that the nursing device enters the wake-up state or the shallow sleep state. Further, the nursing device can respond to an access request of the terminal promptly. Therefore, in this application, through collaboration of the night watch device and the nursing device, the nursing device in the deep sleep state can be woken up promptly, and an energy saving effect of the wireless network is ensured. This resolves a problem that currently, device energy saving and timely wake-up are not balanced.

Optionally, a process in which the night watch device sends the wake-up notification to the nursing device managed by the night watch device includes the night watch device determines received signal strength of the terminal based on the wireless packet, the night watch device determines, in the nursing device managed by the night watch device, a target nursing device corresponding to the received signal strength of the terminal, and the night watch device sends the wake-up notification to the target nursing device.

Optionally, the night watch device stores a correspondence between a received signal strength range and a wake-up range. The night watch device uses, based on the correspondence and the received signal strength of the terminal, a nursing device in a wake-up range corresponding to the received signal strength of the terminal as the target nursing device.

In this application, the night watch device implements, based on the received signal strength of the terminal, hierarchical wake-up of the nursing devices managed by the night watch device, to avoid waking up all nursing devices managed by the night watch device, thereby implementing refined energy saving control.

Optionally, the night watch device may further receive a wake-up response notification sent by a to-be-responded nursing device. The wake-up response notification carries an identifier of an associated terminal of the to-be-responded nursing device, and the to-be-responded nursing device is a nursing device that receives the wake-up notification and that has an associated terminal. After the night watch device determines, based on a received wake-up response notification sent by one or more to-be-responded nursing devices, that all terminals that have sent wireless packets to the night watch device are associated with corresponding to-be-responded nursing devices, the night watch device sends a sleep notification to the nursing device managed by the night watch device. The sleep notification is used to indicate a nursing device that is not associated with a terminal and that is not in a roaming monitoring state to enter the deep sleep state.

Optionally, the wireless network is a wireless local area network, and the wireless packet includes one or more of a probe request frame, an authentication request frame, an association request frame, or a reassociation request frame. Alternatively, the wireless network is a cellular network, and the wireless packet includes one or more of a random access preamble, a radio resource control connection request, an attach request, or a packet data network connectivity request.

Optionally, when any nursing device managed by the night watch device enters the deep sleep state, the night watch device enables the night watch function.

In this application, when the nursing device enters the deep sleep state, the night watch device enables the night watch function, so that the nursing device can be woken up. When no nursing device enters the deep sleep state, the night watch device disables the night watch function, to reduce performance consumption of the night watch device, thereby reducing network overheads.

Optionally, after receiving a pre-sleep notification sent by the any nursing device managed by the night watch device, the night watch device enables the night watch function. The pre-sleep notification is used to indicate that the any nursing device enters the deep sleep state in a target time period. Alternatively, after receiving a night watch function enabling notification sent by a control device, the night watch device enables the night watch function. The control device sends the night watch function enabling notification after receiving a pre-sleep notification sent by the any nursing device managed by the night watch device, and the pre-sleep notification is used to indicate that the any nursing device enters the deep sleep state in a target time period.

According to a second aspect, a device wake-up method is provided, applied to a wireless network. The wireless network includes a plurality of night watch devices and a plurality of nursing devices. Each of the plurality of night watch devices is configured to manage one or more of the nursing devices. When no terminal is connected to the wireless network, the night watch device is in a shallow sleep state or a wake-up state, and the nursing device is in a deep sleep state. When the nursing device receives a wake-up notification sent by the night watch device configured to manage the nursing device, the nursing device enters the wake-up state or the shallow sleep state.

Optionally, after the nursing device enters the shallow sleep state, when the nursing device receives a wireless packet sent by a terminal, the nursing device enters the wake-up state.

Optionally, after that the nursing device enters the wake-up state, when the nursing device has an associated terminal, the nursing device sends a roaming monitoring notification to a neighbor nursing device. The roaming monitoring notification is used to indicate the nursing device to establish a roaming monitoring relationship with the neighbor nursing device, and a nursing device that establishes the roaming monitoring relationship with another nursing device is in a roaming monitoring state or the wake-up state.

In this application, because all neighbor nursing devices of the nursing device that has the associated terminal are in the roaming monitoring state or the wake-up state, a quick response to a roaming request of the terminal can be implemented.

Optionally, after that the nursing device sends a roaming monitoring notification to a neighbor nursing device, when duration in which the nursing device has no associated terminal reaches preset duration, the nursing device sends a roaming monitoring termination notification to the neighbor nursing device. The roaming monitoring termination notification is used to indicate the neighbor nursing device to terminate the roaming monitoring relationship with the nursing device.

Optionally, when the nursing device in the deep sleep state receives a roaming monitoring notification sent by a neighbor nursing device, the nursing device enters a roaming monitoring state, and establishes a roaming monitoring relationship with the neighbor nursing device. When the nursing device in the roaming monitoring state receives a roaming request sent by a terminal, the nursing device enters the wake-up state, and responds to the roaming request. When the nursing device in the roaming monitoring state receives a roaming monitoring termination notification sent by the neighbor nursing device, the nursing device terminates a roaming monitoring relationship with the neighbor nursing device.

Optionally, after that the nursing device terminates a roaming monitoring relationship with the neighbor nursing device, when no roaming monitoring relationship is established between the nursing device and any neighbor nursing devices, the nursing device enters the deep sleep state.

Optionally, after that the nursing device enters the wake-up state, when the nursing device has an associated terminal, the nursing device sends a wake-up response notification to the night watch device that sends the wake-up notification. The wake-up response notification carries an identifier of the associated terminal of the nursing device.

According to a third aspect, a night watch device determining method is provided. A control device obtains neighbor information of all devices in a wireless network. The neighbor information of the device includes identifiers of all neighbor devices of the device, and the neighbor device of the device and the device have one or more same service set identifiers. The control device determines the night watch device in the wireless network based on the neighbor information of all the devices in the wireless network. A union set of all night watch devices in the wireless network and neighbor devices of all the night watch devices includes all the devices in the wireless network.

Optionally, the night watch devices include several devices that have largest quantities of neighbor devices in the wireless network. Alternatively, the night watch devices include several devices that have largest peak values of quantities of terminals historically accessing the wireless network, and the terminal that is of the device and that historically accesses the wireless network include a terminal associated with the device in a historical time period and/or a terminal that accesses the device in the historical time period.

In this application, the control device determines the night watch device in the wireless network based on the neighbor information of all the devices in the wireless network, thereby implementing automatic selection of the night watch device in the wireless network. In addition, because all devices other than the night watch device in the wireless network are the nursing devices, all the devices in the wireless network can be woken up promptly. This can ensure working reliability of the devices while ensuring an energy saving effect of the devices.

According to a fourth aspect, a night watch device is provided. The night watch device includes a plurality of functional modules. The plurality of functional modules interact with each other to implement the method in the first aspect and the implementations of the first aspect. The plurality of functional modules may be implemented based on software, hardware, or a combination of software and hardware, and the plurality of functional modules may be randomly combined or divided based on a specific implementation.

According to a fifth aspect, a nursing device is provided. The nursing device includes a plurality of functional modules. The plurality of functional modules interact with each other to implement the method in the second aspect and the implementations of the second aspect. The plurality of functional modules may be implemented based on software, hardware, or a combination of software and hardware, and the plurality of functional modules may be randomly combined or divided based on a specific implementation.

According to a sixth aspect, a control device is provided. The control device includes a plurality of functional modules. The plurality of functional modules interact with each other to implement the method in the third aspect and the implementations of the third aspect. The plurality of functional modules may be implemented based on software, hardware, or a combination of software and hardware, and the plurality of functional modules may be randomly combined or divided based on a specific implementation.

According to a seventh aspect, a night watch device is provided. The night watch device includes a processor and a memory.

The memory is configured to store computer programs, and the computer programs include program instructions.

The processor is configured to invoke the computer programs to implement the device wake-up method according to any one of the implementations of the first aspect.

According to an eighth aspect, a nursing device is provided. The nursing device includes a processor and a memory.

The memory is configured to store computer programs, and the computer programs include program instructions.

The processor is configured to invoke the computer programs to implement the device wake-up method according to any one of the implementations of the second aspect.

According to a ninth aspect, a control device is provided. The control device includes a processor and a memory.

The memory is configured to store computer programs, and the computer programs include program instructions.

The processor is configured to invoke the computer programs to implement the night watch device determining method according to any one of the implementations of the third aspect.

According to a tenth aspect, a computer storage medium is provided. The computer storage medium stores instructions, and when the instructions are executed by a processor of a night watch device, the device wake-up method according to any one of the implementations of the first aspect is implemented, when the instructions are executed by a processor of a nursing device, the device wake-up method according to any one of the implementations of the second aspect is implemented, or when the instructions are executed by a processor of a control device, the night watch device determining method according to any one of the implementations of the third aspect is implemented.

The technical solutions provided in this application have at least the following beneficial effects.

In this application, the night watch device is disposed in the wireless network. When no terminal is connected to the wireless network, the night watch device is in the shallow sleep state or the wake-up state, and the nursing device is in the deep sleep state. Therefore, the relatively good energy saving effect of the wireless network is achieved. In addition, the night watch device in the shallow sleep state or the wake-up state may listen to the wireless packet of the terminal. When receiving the wireless packet sent by the terminal, the night watch device wakes up the nursing device in the deep sleep state through the wake-up notification, so that the nursing device enters the wake-up state or the shallow sleep state. Further, the nursing device can respond to the access request of the terminal promptly. Therefore, in this application, through the collaboration of the night watch device and the nursing device, the nursing device in the deep sleep state can be woken up promptly, and the energy saving effect of the wireless network is ensured. This resolves the problem that currently, the device energy saving and the timely wake-up are not balanced. In addition, the night watch device implements, based on the received signal strength of the terminal, the hierarchical wake-up of the nursing devices managed by the night watch device, to avoid waking up all the nursing devices managed by the night watch device, thereby implementing the refined energy saving control. When the nursing device enters the deep sleep state, the night watch device enables the night watch function, so that the nursing device can be woken up. When no nursing device enters the deep sleep state, the night watch device disables the night watch function, to reduce the performance consumption of the night watch device, thereby reducing the network overheads.

In this application, all neighbor nursing devices of the nursing device that has the associated terminal are enabled to be in the roaming monitoring state or the wake-up state. In this case, the quick response to the roaming request of the terminal can be implemented.

DETAILED DESCRIPTION OF ILLUSTRATIVE EMBODIMENTS

To make the objectives, technical solutions, and advantages of this application clearer, the following further describes implementations of this application in detail with reference to the accompanying drawings.

Figure 1:
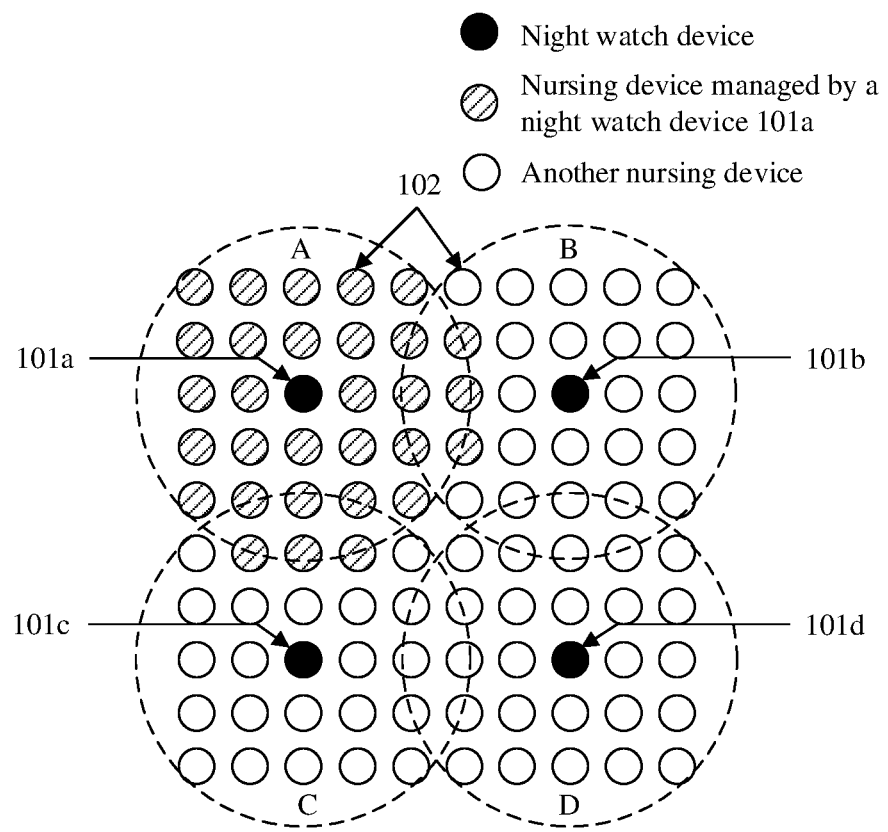
FIG. 1 is a schematic structural diagram of a wireless network according to an embodiment of this application.

FIG. 1 is a schematic structural diagram of a wireless network according to an embodiment of this application. As shown in FIG. 1, the wireless network includes a plurality of night watch devices 101a to 101d (collectively referred to as night watch devices 101) and a plurality of nursing devices 102 (all devices other than the night watch devices 101a to 101d in FIG. 1 are the nursing devices 102). In the accompanying drawing provided in embodiments of this application, quantities and position distribution of the night watch devices and the nursing devices are merely used as an example, and are not used as a limitation on the wireless network provided in the embodiments of this application. The night watch device is a device that enables a night watch function. The nursing device is a device that does not have the night watch function or that disables the night watch function. The device that enables the night watch function does not enter a deep sleep state. If no terminal is associated with the nursing device in a period of time, the nursing device enters the deep sleep state. After enabling the night watch function, the night watch device can wake up the nursing device that is managed by the night watch device and that is in the deep sleep state.

The wireless network related in the embodiments of this application may be a wireless local area network (WLAN) or a cellular network. When the wireless network is the WLAN, the night watch device 101 and the nursing device 102 are access points (AP). When the wireless network is the cellular network, the night watch device 101 and the nursing device 102 are base stations. The following uses an example in which the wireless network is the WLAN for description.

Each night watch device 101 is configured to manage one or more of the nursing devices 102. The night watch device and the nursing device managed by the night watch device have one or more same service set identifiers (SSID). The nursing device managed by each night watch device may be manually specified, or may be determined based on a wireless coverage range of the night watch device. When the nursing device of the night watch device is determined based on the wireless coverage range of the night watch device, the night watch device may manage all nursing devices within the wireless coverage range of the night watch device. When the nursing device managed by the night watch device is manually specified, the night watch device may manage all or some of the nursing devices within the wireless coverage range of the night watch device.

Figure 2:
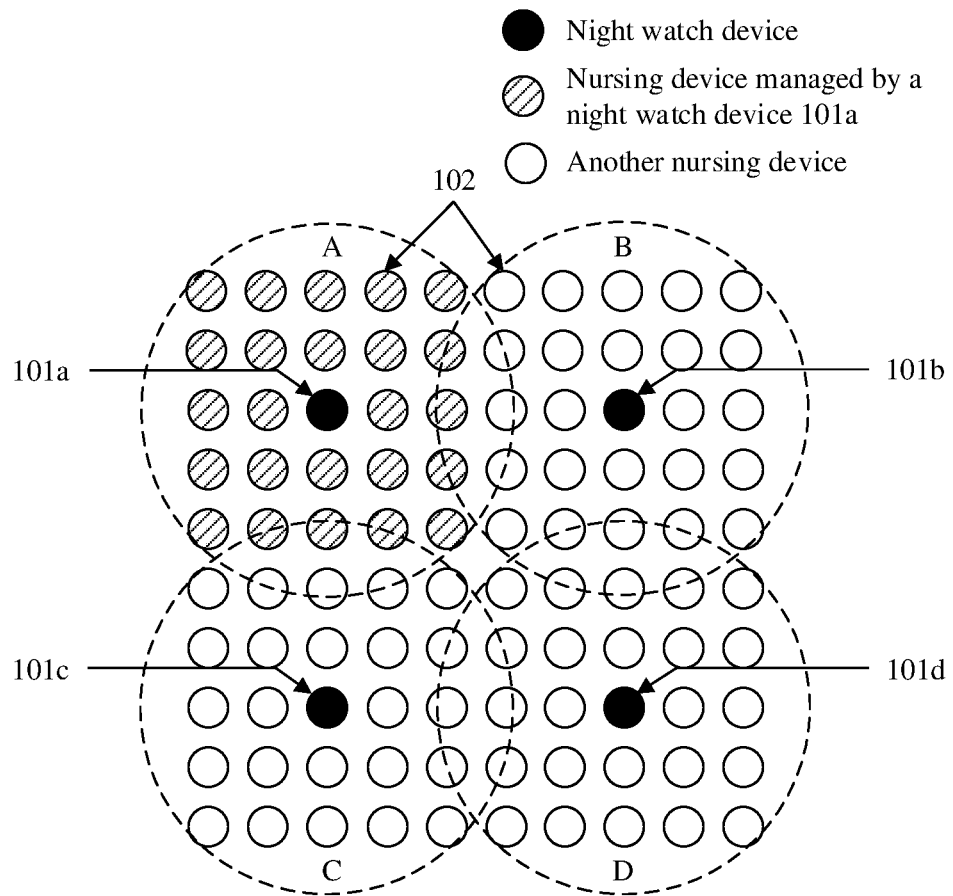
FIG. 2 is a schematic structural diagram of another wireless network according to an embodiment of this application.

Optionally, FIG. 2 is a schematic structural diagram of another wireless network according to an embodiment of this application. As shown in FIG. 2, the wireless network includes the plurality of night watch devices 101a to 101d and the plurality of nursing devices 102. Referring to FIG. 1 and FIG. 2, an area A is a wireless coverage area of the night watch device 101a, an area B is a wireless coverage area of the night watch device 101b, an area C is a wireless coverage area of the night watch device 101c, and an area D is a wireless coverage area of the night watch device 101d. Referring to FIG. 1, each night watch device 101 may manage all nursing devices 102 in the wireless coverage area of the night watch device 101. Alternatively, referring to FIG. 2, each night watch device 101 may manage some nursing devices 102 in the wireless coverage area of the night watch device 101. For ease of illustration, in FIG. 1 and FIG. 2, only the nursing device 102 managed by the night watch device 101a is marked. For a division manner of nursing devices managed by another night watch device, refer to a division manner of the nursing devices managed by the night watch device 101a.

Each nursing device 102 is managed by at least one night watch device 101. Optionally, some nursing devices 102 may be managed by the plurality of night watch devices 101. For example, referring to FIG. 2, each nursing device 102 is managed by one night watch device 101. For another example, referring to FIG. 1, the nursing device 102 located in an overlapping area of wireless coverage ranges of two night watch devices 101 is managed by the two night watch devices 101. The night watch device may directly or indirectly communicate with each nursing device managed by the night watch device.

Figure 3:
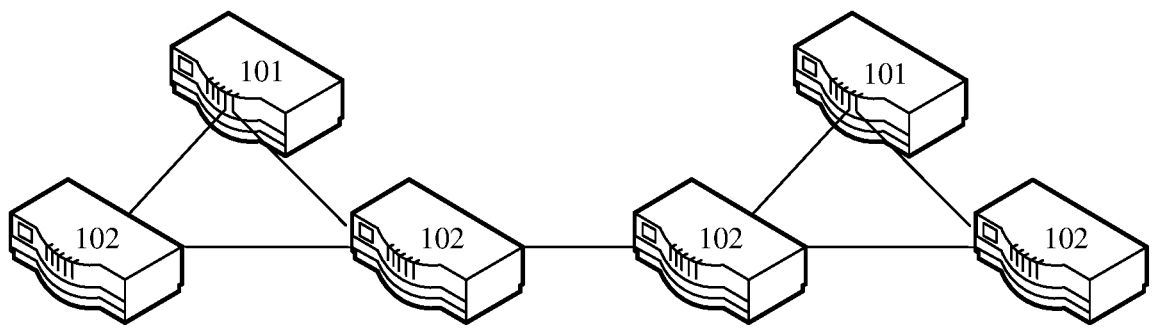
FIG. 3 is a schematic structural diagram of a device wake-up system according to an embodiment of this application.

Optionally, FIG. 3 is a schematic structural diagram of a device wake-up system according to an embodiment of this application. As shown in FIG. 3, the device wake-up system includes the plurality of night watch devices 101 and the plurality of nursing devices 102 in a wireless network. Optionally, the wireless network may be the wireless network shown in FIG. 1 or FIG. 2. A wireless connection or a wired connection is established between the night watch device 101 and the managed nursing device 102, and the night watch device 101 directly communicates with the managed nursing device 102 through a wireless air interface or a wired interface.

Figure 4:
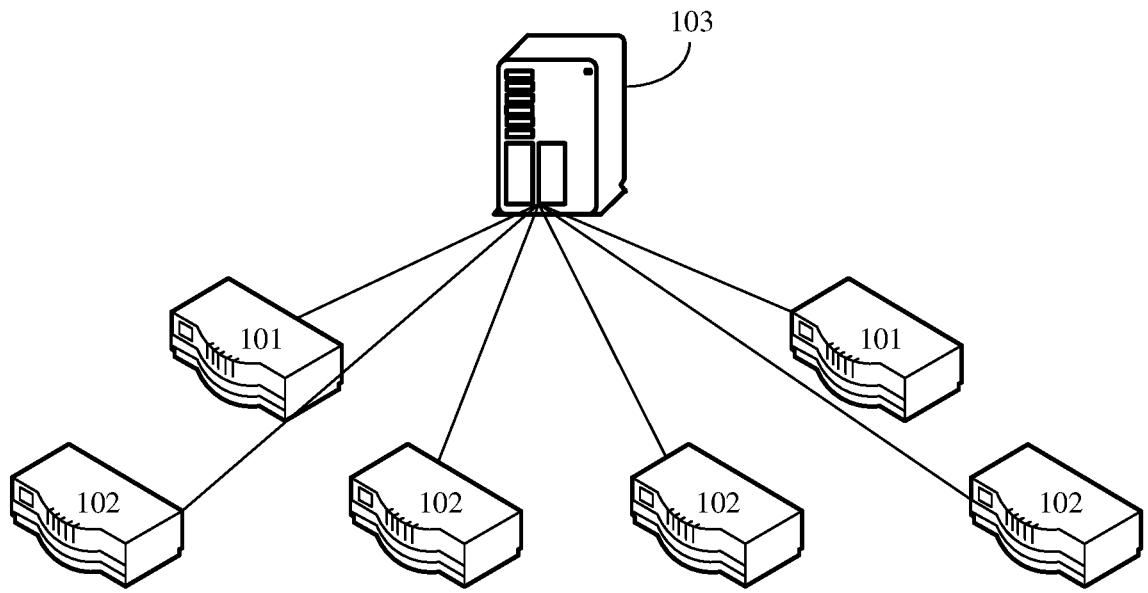
FIG. 4 is a schematic structural diagram of another device wake-up system according to an embodiment of this application.

Optionally, FIG. 4 is a schematic structural diagram of another device wake-up system according to an embodiment of this application. As shown in FIG. 4, the device wake-up system further includes a control device 103. All devices (including the night watch device 101 and the nursing device 102) in a wireless network are connected to the control device 103 through a wired network. The night watch device 101 indirectly communicates with the managed nursing device 102 by using the control device 103. The control device 103 may be a wireless network controller, a network management device, a gateway, or another device having a control capability. The control device 103 may be one or more devices.

In this embodiment of this application, when no terminal is connected to the wireless network, the night watch device 101 is in a shallow sleep state or a wake-up state, and the nursing device 102 is in a deep sleep state. A quantity of running components of a device in a wake-up state is greater than a quantity of running components of a device in a shallow sleep state, and the quantity of running components of the device in the shallow sleep state is greater than a quantity of running components of a device in a deep sleep state. In this embodiment of this application, an AP is used as an example to separately describe the device in the wake-up state, the device in the shallow sleep state, and the device in the deep sleep state.

Figure 5:
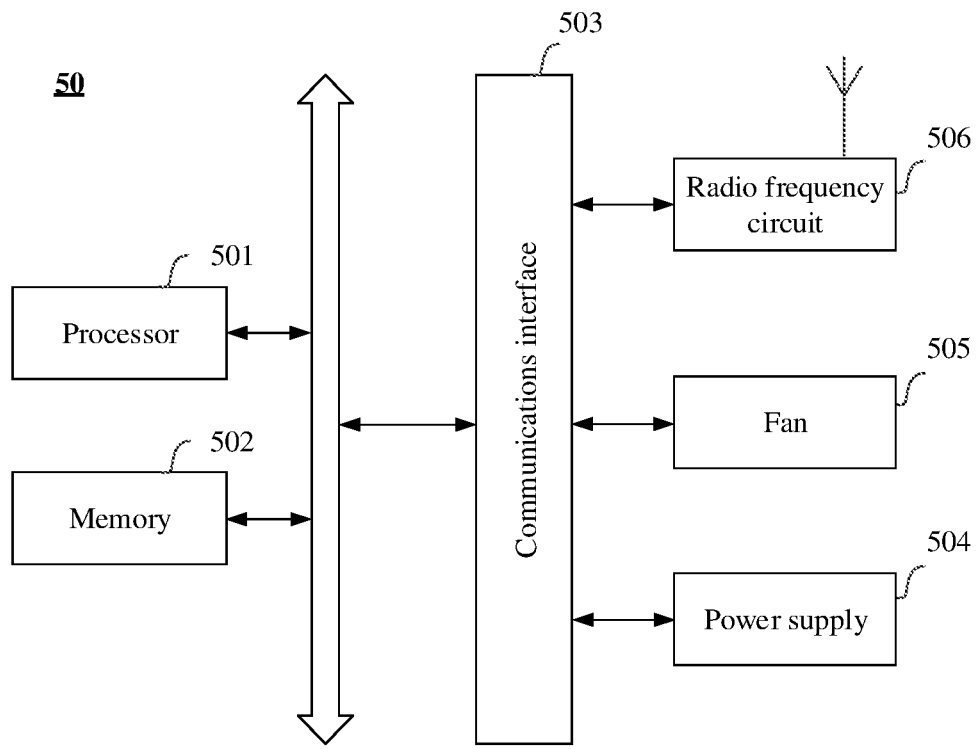
FIG. 5 is a schematic structural diagram of an AP according to an embodiment of this application.

For example, FIG. 5 is a schematic structural diagram of an AP according to an embodiment of this application. As shown in FIG. 5, the AP 50 includes a processor 501, a memory 502, a communications interface 503, and a plurality of peripheral devices. The processor 501, the memory 502, and the communications interface 503 are connected to each other through a bus or a signal cable. Each peripheral device is connected to the communications interface 503 through the bus, the signal cable, or a circuit board. The peripheral device may include one or more of a power supply 504, a fan 505, and a radio frequency circuit 506.

The processor 501 may include one or more processing cores, for example, a 4-core processor or an 8-core processor. The processor 501 may include a main processor and a coprocessor. The main processor is a processor configured to process data when the AP is in the wake-up state. The coprocessor is a processor with low power consumption, configured to process data when the AP is in the shallow sleep state. Both the main processor and the coprocessor are central processing units (CPU). The processor 501 may further include a hardware circuit, for example, a digital signal processor (DSP), a field programmable gate array (FPGA), or a programmable logic array (PLA).

The memory 502 may include one or more computer-readable storage media, where the computer-readable storage media may be non-transient. The memory 502 may further include a high-speed random access memory and a non-volatile memory, such as one or more magnetic disk storage devices or flash memory storage devices.

The communications interface 503 may be configured to connect at least one peripheral device related to input/output (I/O) to the processor 501 and the memory 502. The processor 501, the memory 502, and the communications interface 503 may be integrated into a same chip or a same circuit board. Alternatively, any one or two of the processor 501, the memory 502, and the communications interface 503 may be implemented on a separate chip or a separate circuit board. This is not limited in this embodiment of this application.

The power supply 504 is configured to supply power to each component in the AP 50.

The fan 505 is configured to cool each component in the AP 50.

The radio frequency circuit 506 is configured to receive and transmit radio frequency (RF) signals, which are also called electromagnetic signals. The radio frequency circuit 506 communicates with another device in a wireless network by using the electromagnetic signal. The radio frequency circuit 506 converts an electrical signal into an electromagnetic signal for transmission, or converts a received electromagnetic signal into an electrical signal. Optionally, the radio frequency circuit 506 includes an antenna system, an RF transceiver, one or more amplifiers, a tuner, an oscillator, a digital signal processor, a codec chip group, a subscriber identity module card, or the like.

When the AP is in the wake-up state, the AP runs the main processor, the memory, all communications interfaces, and all peripheral devices. When the AP is in the shallow sleep state, the AP runs the coprocessor, the memory, some communications interfaces, the power supply, and the radio frequency circuit. In other words, the power supply stops supplying power to the fan and a communications interface related to the fan. When the AP is in the deep sleep state, the AP enables only some power supplies and some radio frequency circuits. In other words, the power supply supplies power only to a radio frequency circuit configured to receive a wireless wake-up notification, and does not supply power to another component. Alternatively, when the AP is in the deep sleep state, the AP enables only some power supplies and some wired interfaces. In other words, the power supply supplies power only to a wired interface configured to receive a wired wake-up notification, and does not supply power to another component.

In this embodiment of this application, that no terminal is connected to the wireless network means that no terminal is connected to a device in the wireless network. In other words, the device in the wireless network has no associated terminal, and does not receive a wireless packet sent by the terminal. In this embodiment of this application, the associated terminal of the device is a terminal that has established a communication connection to the device. Optionally, when the wireless network is a WLAN, the wireless packet includes one or more of a probe request frame, an authentication request frame, an association request frame, or a reassociation request frame. When the wireless network is a cellular network, the wireless packet includes one or more of a random access (RA) preamble, a radio resource control (RRC) connection request, an attach request, or a packet data network (PDN) connectivity request.

For example, a process in which the terminal connects to the WLAN includes the following steps. The terminal receives a beacon frame sent by the AP, or the terminal sends the probe request frame to the AP, and receives a probe response frame sent by the AP, the terminal sends the authentication request frame to the AP, and receives an authentication response frame sent by the AP, and the terminal sends the association request frame to the AP, and receives an association response frame sent by the AP. After the terminal is associated with an AP, the terminal may access the AP, for example, send a data packet to the AP. Therefore, when the AP in the WLAN has no associated terminal, and does not receive, in a period of time, the probe request frame, the authentication request frame, the association request frame, or the reassociation request frame sent by the terminal, it may be considered that no terminal is connected to the WLAN.

In an optional embodiment of this application, a night watch device in the wireless network is determined in a manual selection manner based on a network topology and a wireless coverage status. For example, in the device wake-up system shown in FIG. 3, the night watch device in the wireless network may be determined in the manual selection manner. For example, for the cellular network, a macro base station may be determined as the night watch device, and a cellular micro base station may be determined as the nursing device.

Figure 6:
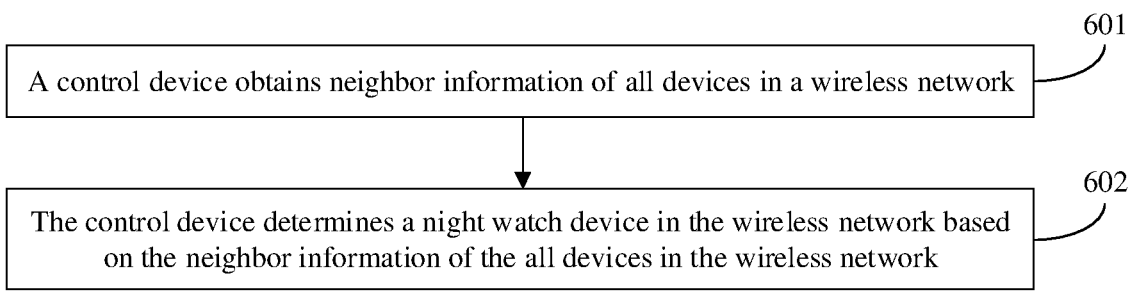
FIG. 6 is a flowchart of a night watch device determining method according to an embodiment of this application.

In another optional embodiment of this application, a night watch device in the wireless network is determined in an automatic selection manner. For example, in the device wake-up system shown in FIG. 4, the night watch device in the wireless network may be determined by the control device. Optionally, FIG. 6 is a flowchart of a night watch device determining method according to an embodiment of this application. As shown in FIG. 6, the method includes the following steps.

Step 601: A control device obtains neighbor information of all devices in a wireless network.

The neighbor information of the device includes identifiers of all neighbor devices of the device. A neighbor device of a device and the device have one or more same SSIDs.

Optionally, each device in the wireless network probes information about a surrounding adjacent device based on a radio signal of an air interface, where the information includes an identifier, an SSID, and received signal strength that are of the adjacent device. The identifier of the adjacent device may be a medium access control (MAC) address of the adjacent device. A neighbor device of each device is determined based on the SSID and the received signal strength that are of the adjacent device and that are probed by the device.

In a possible implementation, the device in the wireless network determines, based on the probed information about the adjacent device, an adjacent device that has at least one same SSID with the device and whose received signal strength is greater than a specified signal strength threshold as the neighbor device of the device.

In another possible implementation, the device in the wireless network reports the probed information about the adjacent device to the control device. The control device determines, based on information that is about an adjacent device and that is probed by a device, an adjacent device that has at least one same SSID with the device and whose received signal strength is greater than a specified signal strength threshold as a neighbor device of the device.

Step 602: The control device determines a night watch device in the wireless network based on the neighbor information of all the devices in the wireless network.

A union set of all night watch devices in the wireless network and neighbor devices of all the night watch devices includes all the devices in the wireless network. In this embodiment of this application, all devices other than the night watch device in the wireless network are nursing devices.

Optionally, the night watch devices include several devices that have largest quantities of neighbor devices in the wireless network. Alternatively, the night watch devices include several devices that have largest peak values of quantities of terminals historically accessing the wireless network, and the terminal that is of the device and that historically accesses the wireless network include a terminal associated with the device in a historical time period and/or a terminal that accesses the device in the historical time period. Certainly, the night watch devices may further include several devices that have largest average values of peak values of data of terminals historically accessing the wireless network. A specific manner of determining the night watch device in the wireless network is not limited in this embodiment of this application. In this embodiment of this application, the following three manners of determining, in the wireless network, the night watch device in the wireless network are used as an example for description.

In a first manner, the control device determines, as the night watch devices, several devices that have largest quantities of neighbor devices in the wireless network. A process in which the control device determines the night watch device in the wireless network based on the neighbor information of all the devices in the wireless network includes the control device executes a procedure of obtaining a first candidate night watch device set, to obtain n candidate night watch device sets, where n is a positive integer, and the control device determines, as the night watch devices in the wireless network, all devices in a candidate night watch device set that includes a smallest quantity of devices and that is in the n candidate night watch device sets.

The procedure of obtaining the first candidate night watch device set includes the following.

S11: Generate an entire-network neighbor relationship set and the candidate night watch device set, where the entire-network neighbor relationship set includes a neighbor relationship of each device in the wireless network, the neighbor relationship of each device includes correspondences between each device and any neighbor devices, and the candidate night watch device set is an empty set.

For example, it is assumed that the wireless network includes seven devices (a device A to a device G). The entire-network neighbor relationship set generated by the control device based on neighbor relationships of the seven devices is shown in Table 1.

TABLE 1

| Device name | Neighbor device 1 | Neighbor device 2 | Neighbor device 3 | Neighbor device 4 |
| --- | --- | --- | --- | --- |
| Device A | Device B | Device C | Device D | / |
| Device B | Device A | Device C | Device E | Device G |
| Device C | Device A | Device B | Device D | Device F |
| Device D | Device A | Device C | Device G | / |
| Device E | Device B | Device F | / | / |
| Device F | Device C | Device E | / | / |
| Device G | Device B | Device D | / | / |

Referring to Table 1, the device A has three neighbor devices, and a neighbor relationship of the device A includes three groups of correspondences: device A-device B, device A-device C, and device A-device D. Similarly, the device B has four neighbor devices, and a neighbor relationship of the device B includes four groups of correspondences. The device C has four neighbor devices, and a neighbor relationship of the device C includes four groups of correspondences. The device D has three neighbor devices, and a neighbor relationship of the device D includes three groups of correspondences. The device E has two neighbor devices, and a neighbor relationship of the device E includes two groups of correspondences. The device F has two neighbor devices, and a neighbor relationship of the device F includes two groups of correspondences. The device G has two neighbor devices, and a neighbor relationship of the device G includes two groups of correspondences. In this embodiment of this application, correspondences in a neighbor relationship of each device are not listed one by one herein.

S12: Execute a set update procedure to obtain the n candidate night watch device sets, where the set update procedure includes learning several target devices that have largest quantities of neighbor devices and that are in the entire-network neighbor relationship set, and executing a procedure of determining a night watch device for each target device. The procedure of determining the night watch device includes the following steps.

S121: Add the target device to the candidate night watch device set, to obtain an updated candidate night watch device set.

S122: Delete, from the entire-network neighbor relationship set, all correspondences that include the target device, to obtain an updated entire-network neighbor relationship set.

S123: If the entire-network neighbor relationship set is not the empty set, execute the set update procedure again.

S124: If the entire-network neighbor relationship set is the empty set, output the candidate night watch device set.

For example, still referring to the example in S11, the control device learns the device B and the device C as shown in Table 1 that are in the entire-network neighbor relationship set and that have largest quantities of neighbor devices, and separately executes, for the device B and the device C, a procedure of determining a night watch device.

1. The procedure of determining the night watch device executed for the device B includes the following.

(1): Add the device B to the candidate night watch device set, and delete, from the entire-network neighbor relationship set shown in Table 1, all correspondences that include the device B, to obtain an updated entire-network neighbor relationship set shown in Table 2.

TABLE 2

| Device name | Neighbor device 1 | Neighbor device 2 | Neighbor device 3 | Neighbor device 4 |
|---|---|---|---|---|
| Device A | / | Device C | Device D | / |
| / | / | / | / | / |
| Device C | Device A | / | Device D | Device F |
| Device D | Device A | Device C | Device G | / |
| Device E | / | Device F | / | / |
| Device F | Device C | Device E | / | / |
| Device G | / | Device D | / | / |

Referring to Table 2, in the updated entire-network neighbor relationship set, the device A has two neighbor devices, the device C has three neighbor devices, the device D has three neighbor devices, the device E has one neighbor device, the device F has two neighbor devices, and the device G has one neighbor device.

(2): Learn the device C and the device D that have largest quantities of neighbor devices and that are in the entire-network neighbor relationship set shown in Table 2, and separately execute, for the device C and the device D, a procedure of determining a night watch device.

For example, the procedure of determining the night watch device executed for the device C includes the following.

(2.1): Add the device C to the candidate night watch device set, and delete, from the entire-network neighbor relationship set shown in Table 2, all correspondences that include the device C, to obtain an updated entire-network neighbor relationship set shown in Table 3.

TABLE 3

| Device name | Neighbor device 1 | Neighbor device 2 | Neighbor device 3 | Neighbor device 4 |
|---|---|---|---|---|
| Device A | / | / | Device D | / |
| / | / | / | / | / |
| / | / | / | / | / |

TABLE 3-continued

| Device name | Neighbor device 1 | Neighbor device 2 | Neighbor device 3 | Neighbor device 4 |
|---|---|---|---|---|
| Device D | Device A | / | Device G | / |
| Device E | / | Device F | / | / |
| Device F | / | Device E | / | / |
| Device G | / | Device D | / | / |

Referring to Table 3, in the updated entire-network neighbor relationship set, the device A has one neighbor device, the device D has two neighbor devices, the device E has one neighbor device, the device F has one neighbor device, and the device G has one neighbor device.

(2.1.2): Learn the device D that has a largest quantity of neighbor devices and that is in the entire-network neighbor relationship set shown in Table 3, and execute the procedure of determining the night watch device for the device D: adding the device D to the candidate night watch device set, and deleting, from the entire-network neighbor relationship set shown in Table 3, all correspondences that include the device D, to obtain an updated entire-network neighbor relationship set shown in Table 4.

TABLE 4

| Device name | Neighbor device 1 | Neighbor device 2 | Neighbor device 3 | Neighbor device 4 |
|---|---|---|---|---|
| / | / | / | / | / |
| / | / | / | / | / |
| / | / | / | / | / |
| Device E | / | Device F | / | / |
| Device F | / | Device E | / | / |
| / | / | / | / | / |

Referring to Table 4, in the updated entire-network neighbor relationship set, the device E has one neighbor device, and the device F has one neighbor device.

(2.1.3): Add the device E to the candidate night watch device set, to obtain a candidate night watch device set 1 that includes the device B, the device C, the device D, and the device E, or add the device F to the candidate night watch device set, to obtain a candidate night watch device set 2 that includes the device B, the device C, the device D, and the device F.

(2.2): The procedure of determining the night watch device executed for the device D includes the following.

(2.2.1): Add the device D to the candidate night watch device set, and delete, from the entire-network neighbor relationship set shown in Table 2, all correspondences that include the device D, to obtain an updated entire-network neighbor relationship set shown in Table 5.

TABLE 5

| Device name | Neighbor device 1 | Neighbor device 2 | Neighbor device 3 | Neighbor device 4 |
|---|---|---|---|---|
| Device A | / | Device C | / | / |
| / | / | / | / | / |
| Device C | Device A | / | / | Device F |
| / | / | / | / | / |
| Device E | / | Device F | / | / |
| Device F | Device C | Device E | / | / |
| / | / | / | / | / |

Referring to Table 5, in the updated entire-network neighbor relationship set, the device A has one neighbor device, the device C has two neighbor devices, the device E has one neighbor device, and the device F has two neighbor devices.

(2.2.2): Learn the device C and the device F that have largest quantities of neighbor devices and that are in the entire-network neighbor relationship set shown in Table 5, and separately execute, for the device C and the device F, a procedure of determining a night watch device.

The procedure of determining the night watch device is executed for the device C. Finally, the candidate night watch device set 1 that includes the device B, the device D, the device C, and the device E may be obtained, or the candidate night watch device set 2 that includes the device B, the device D, the device C, and the device F may be obtained. The procedure of determining the night watch device is executed for the device F. Finally, a candidate night watch device set 3 that includes the device B, the device D, the device F, and the device A may be obtained, or the candidate night watch device set 2 that includes the device B, the device D, the device F, and the device C may be obtained.

2. For the procedure of determining the night watch device executed for the device C, refer to the foregoing procedure of determining the night watch device executed for the device B. Finally, the candidate night watch device set 1 that includes the device C, the device B, the device D, and the device E may be obtained, or the candidate night watch device set 2 that includes the device C, the device B, the device D, and the device E may be obtained.

It can be learned from the foregoing description that the three candidate night watch device sets may be finally obtained in the foregoing manner. Because a quantity of devices in the candidate night watch device set 1 (including the device B, the device C, the device D, and the device E), a quantity of devices in the candidate night watch device set 2 (including the device B, the device C, the device D, and the device F), and a quantity of devices in the candidate night watch device set 3 (including the device A, the device B, the device D, and the device F) are the same, the control device may determine the devices in any one of the three candidate night watch device sets as the night watch devices in the wireless network.

In this embodiment of this application, the control device determines, as the night watch devices, the several devices that have largest quantities of neighbor devices in the wireless network, so that a quantity of the night watch devices can be relatively small.

In a second manner, a process in which the control device determines the night watch device in the wireless network based on the neighbor information of all the devices in the wireless network includes the control device executes a procedure of obtaining a second candidate night watch device set, to obtain m candidate night watch device sets, where m is a positive integer, and the control device determines, as the night watch devices in the wireless network, all devices in a candidate night watch device set that includes a smallest quantity of devices and that is in the m candidate night watch device sets.

The procedure of obtaining the second candidate night watch device set includes the following.

S21: Generate an entire-network neighbor relationship set and the candidate night watch device set, where the entire-network neighbor relationship set includes a neighbor relationship of each device in the wireless network, the neighbor relationship of each device includes correspondences between each device and any neighbor devices, and the candidate night watch device set is an empty set.

S22: Execute a set update procedure to obtain the m candidate night watch device sets, where the set update procedure includes learning several target devices that have smallest quantities of neighbor devices and that are in the entire-network neighbor relationship set, learning several target neighbor devices that have largest quantities of neighbor devices and that are in the entire-network neighbor relationship set, and executing a procedure of determining a night watch device for each target neighbor device.

Optionally, when the entire-network neighbor relationship set includes a plurality of target devices that have smallest quantities of neighbor devices, subsequent steps are performed for each target device. A device that has a smallest quantity of neighbor devices in the wireless network is usually an edge device in the wireless network.

The procedure of determining the night watch device includes the following steps.

S221: Add the target neighbor device to the candidate night watch device set, to obtain an updated candidate night watch device set.

S222: Delete, from the entire-network neighbor relationship set, all correspondences that include the target neighbor device, to obtain an updated entire-network neighbor relationship set.

S223: If the entire-network neighbor relationship set is not the empty set, execute the set update procedure again.

S224: If the entire-network neighbor relationship set is the empty set, output the candidate night watch device set.

In this embodiment of this application, the night watch devices are determined from an edge of the wireless network. This can ensure that the edge device of the wireless network can be woken up promptly. In addition, neighbor devices that have largest quantities of neighbor devices and that are in all neighbor devices of the edge device are determined as the night watch devices, so that a quantity of the night watch devices can be relatively small.

In a third manner, the control device determines, as the night watch devices, several devices that have largest peak values of quantities of terminals historically accessing the wireless network. A process in which the control device determines the night watch device in the wireless network based on the neighbor information of all the devices in the wireless network includes the control device executes a procedure of obtaining a third candidate night watch device set, to obtain p candidate night watch device sets, where p is a positive integer, and the control device determines, as the night watch devices in the wireless network, all devices in a candidate night watch device set that includes a smallest quantity of devices and that is in the p candidate night watch device sets.

The procedure of obtaining the third candidate night watch device set includes the following.

S31: Generate an entire-network neighbor relationship set and the candidate night watch device set, where the entire-network neighbor relationship set includes a neighbor relationship of each device in the wireless network, the neighbor relationship of each device includes correspondences between each device and any neighbor devices, and the candidate night watch device set is an empty set.

S32: Execute a set update procedure to obtain the p candidate night watch device sets, where the set update procedure includes learning several target devices that have largest peak values of quantities of terminals accessing the wireless network and that are in the entire-network neighbor relationship set, and executing a procedure of determining a night watch device for each target device.

The procedure of determining the night watch device includes the following steps.

S321: Add the target device to the candidate night watch device set, to obtain an updated candidate night watch device set.

S322: Delete, from the entire-network neighbor relationship set, all correspondences that include the target device, to obtain an updated entire-network neighbor relationship set.

S323: If the entire-network neighbor relationship set is not the empty set, execute the set update procedure again.

S324: If the entire-network neighbor relationship set is the empty set, output the candidate night watch device set.

In this embodiment of this application, the control device determines, as the night watch devices, the several devices that have the largest peak values of quantities of terminals historically accessing the wireless network, so that a quantity of the night watch devices can be relatively small.

Optionally, the foregoing three manners may be used in combination. For example, the control device may determine, as the night watch device in the wireless network, a device in a final candidate night watch device set that includes a smallest quantity of devices and that is obtained in the foregoing three manners. This is not limited in this embodiment of this application.

In this embodiment of this application, all devices other than a device that is determined as a night watch device and that belongs to neighbor devices of the night watch device may be used as nursing devices of the night watch device.

In conclusion, according to the night watch device determining method provided in this embodiment of this application, the control device determines the night watch device in the wireless network based on the neighbor information of all the devices in the wireless network, thereby implementing automatic selection of the night watch device in the wireless network. In addition, because all devices other than the night watch device in the wireless network are the nursing devices, all the devices in the wireless network can be woken up promptly. This can ensure working reliability of the devices while ensuring an energy saving effect of the devices.

The night watch device provided in this embodiment of this application may perform only a night watch function. In other words, the night watch device is specially configured to wake up the nursing device. Alternatively, the night watch device may perform both the night watch function and a forwarding function. When the night watch device enables the night watch function, the night watch device can be configured to: wake up the nursing device and forward service data. When the night watch device disables the night watch function, the night watch device is configured to forward service data.

Optionally, this embodiment of this application provides the following two possible implementations, so that the night watch device can automatically enable and disable the night watch function.

In a possible implementation, based on an application scenario of the wireless network, the night watch device in the wireless network may enable and/or disable, in a manual planning manner, the night watch function at a scheduled time. For example, for a campus network, the night watch device can disable the night watch function during a working time period and enable the night watch function during a non-working time period. For a home network, the night watch device can enable the night watch function in the working time period and disable the night watch function in the non-working time period. The working time period may be from 8:00 to 18:00, and the non-working time period may be from 18:00 to 8:00 of a next day.

In another possible implementation, the night watch device in the wireless network may flexibly enable and/or disable the night watch function based on a connection status of a terminal in the wireless network.

Optionally, when any nursing device managed by the night watch device enters a deep sleep state, the night watch device enables the night watch function. When all nursing devices managed by the night watch device are in a wake-up state, the night watch device disables the night watch function.

In an optional embodiment of this application, when the nursing device is ready to enter the deep sleep state, the nursing device sends a pre-sleep notification to the night watch device that manages the nursing device. The pre-sleep notification is used to indicate that the nursing device enters the deep sleep state in a target time period. In other words, the pre-sleep notification is used to indicate that the nursing device is about to enter the deep sleep state. After the night watch device receives a pre-sleep notification sent by any nursing device managed by the night watch device, the night watch device enables the night watch function. Optionally, after receiving the pre-sleep notification sent by the nursing device managed by the night watch device, the night watch device may immediately enable the night watch function, or enable the night watch function after waiting for a period of time. This is not limited in this embodiment of this application.

In another optional embodiment of this application, when the nursing device is ready to enter the deep sleep state, the nursing device sends a pre-sleep notification to the control device. The pre-sleep notification is used to indicate that the nursing device enters the deep sleep state in a target time period. In other words, the pre-sleep notification is used to indicate that the nursing device is about to enter the deep sleep state. After receiving the pre-sleep notification sent by any nursing device, the control device determines, based on an identifier of the nursing device that sends the pre-sleep notification, a night watch device that manages the nursing device, and sends a night watch function enabling notification to the night watch device that manages the nursing device. After the night watch device receives the night watch function enabling notification sent by the control device, the night watch device enables the night watch function. Optionally, after receiving the pre-sleep notification sent by the nursing device, the control device may immediately send the night watch function enabling notification to the night watch device that manages the nursing device, or send, after waiting for a period of time, the night watch function enabling notification to the night watch device that manages the nursing device. This is not limited in this embodiment of this application.

In this embodiment of this application, when the nursing device enters the deep sleep state, the night watch device enables the night watch function, so that the nursing device can be woken up. When no nursing device enters the deep sleep state, the night watch device disables the night watch function, to reduce performance consumption of the night watch device, thereby reducing network overheads.

Figure 7:
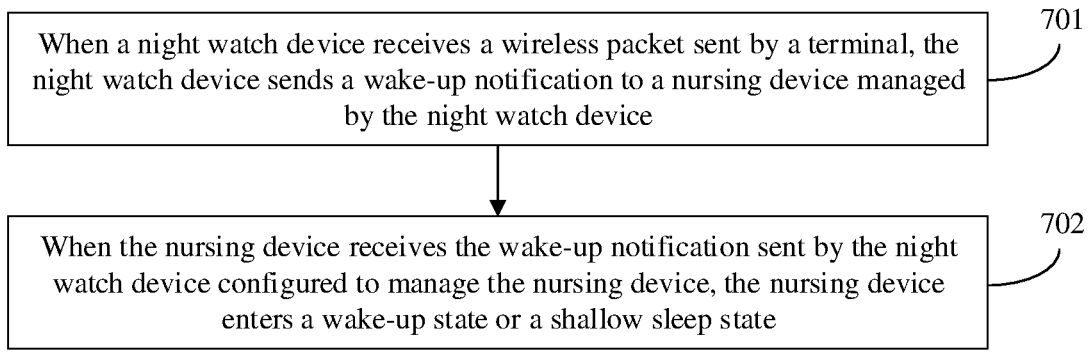
FIG. 7 is a flowchart of a device wake-up method according to an embodiment of this application.

Optionally, an embodiment of this application further provides a device wake-up method. The method may be applied to the wireless network shown in FIG. 1 or FIG. 2, or the method may further be applied to the device wake-up system shown in FIG. 3 or FIG. 4. All night watch devices related to the device wake-up method are night watch devices that have enabled a night watch function. FIG. 7 is a flowchart of a device wake-up method according to an embodiment of this application. As shown in FIG. 7, the method includes the following steps.

Step 701: When the night watch device receives a wireless packet sent by a terminal, the night watch device sends a wake-up notification to a nursing device managed by the night watch device.

In this embodiment of this application, the night watch device is configured to probe and sense whether the terminal is connected to a wireless network. When the night watch device receives the wireless packet sent by the terminal, the night watch device determines that the terminal intends to establish a communication connection to a device in the wireless network. In this case, the night watch device generates the wake-up notification, and sends the wake-up notification to the nursing device managed by the night watch device. For example, when the wireless network is a WLAN, if the night watch device receives a probe request frame, an authentication request frame, an association request frame, or a reassociation request frame sent by the terminal, the night watch device determines that the terminal intends to establish the communication connection to a device in the wireless network. Alternatively, the night watch device may determine, only when receiving an authentication request frame, an association request frame, or a reassociation request frame sent by the terminal, that the terminal intends to establish the communication connection to a device in the wireless network, to avoid a case in which the wireless network is mistakenly woken up because a probe request frame sent by the terminal is used only to probe the network.

Optionally, when the wireless packet is the probe request frame, the probe request frame may be carried in the wake-up notification. For example, the probe request frame sent by the terminal may be carried in a data field of the wake-up notification.

Optionally, when the wireless packet is the authentication request frame, the association request frame, or the reassociation request frame, after successfully associating with the terminal, the night watch device may guide the terminal to roam and hand over to the nursing device woken up by the night watch device.

In a first implementation of step 701, when the night watch device receives the wireless packet sent by the terminal, the night watch device sends the wake-up notification to all nursing devices managed by the night watch device.

For example, in the device wake-up system shown in FIG. 3, the night watch device may send, in a broadcast or multicast manner, the wake-up notification to all the nursing devices managed by the night watch device. In the device wake-up system shown in FIG. 4, the night watch device may send the wake-up notification to the control device in a unicast manner through a wired network. The control device sends, in the broadcast or multicast manner through the wired network, the wake-up notification to all the nursing devices managed by the night watch device. The control device may store a correspondence between each night watch device in the wireless network and a nursing device managed by the night watch device. When receiving the wake-up notification sent by the night watch device, the control device may learn, based on the correspondence, the nursing device managed by the night watch device, and send the wake-up notification to the nursing device managed by the night watch device.

In a second implementation of step 701, when the night watch device receives the wireless packet sent by the terminal, the night watch device determines received signal strength of the terminal based on the wireless packet. The night watch device determines, in the nursing device managed by the night watch device, a target nursing device corresponding to the received signal strength of the terminal. The night watch device sends the wake-up notification to the target nursing device.

Optionally, the night watch device stores a correspondence between a received signal strength range and a wake-up range. The night watch device uses, based on the correspondence between the received signal strength range and the wake-up range, and the received signal strength of the terminal, a nursing device in a wake-up range corresponding to the received signal strength of the terminal as the target nursing device.

Because the terminal is usually connected to a device that is relatively close to the terminal, to ensure a communication effect of the terminal, the night watch device may wake the nursing device within a corresponding distance range based on a distance from the terminal to the night watch device. In this embodiment of this application, the nursing device in the wake-up range corresponding to the received signal strength of the terminal is used as the target nursing device. Essentially, the nursing device in a wake-up area in which the terminal is located is used as the target nursing device.

Figure 8:
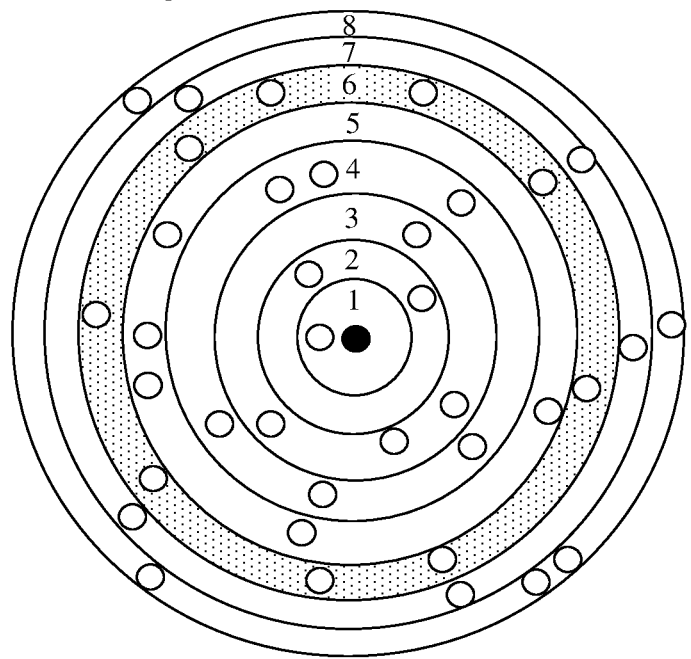
FIG. 8 is a schematic diagram of a wake-up area of a night watch device according to an embodiment of this application.

For example, FIG. 8 is a schematic diagram of a wake-up area of a night watch device according to an embodiment of this application. As shown in FIG. 8, the night watch device is corresponding to eight wake-up areas, and a wake-up area 1 to a wake-up area 8 are sequentially included in ascending order of distances from the night watch device. When it is determined, based on the received signal strength of the terminal, that the terminal is in the wake-up area 6, the night watch device may send the wake-up notification to a nursing device in the wake-up area 6, or the night watch device may send the wake-up notification to nursing devices in the wake-up area 5 to the wake-up area 7. For a manner in which the night watch device sends the wake-up notification to the nursing device, refer to related descriptions in the first implementation of step 701. Details are not described herein again in this embodiment of this application.

Optionally, the distance from the terminal to the night watch device may be determined based on the received signal strength of the terminal. For example, the night watch device may determine the distance from the terminal to the night watch device based on the received signal strength of the terminal by using a technology, for example, wireless positioning or field strength fingerprint-based positioning. A relative position between the nursing device and the night watch device may be manually configured in the night watch device, or may be determined by the night watch device by using a wireless positioning technology. For example, the night watch device may determine a distance and a direction from each nursing device to the night watch device by using a three-point positioning method, an angle of arrival (AOA) ranging method, or an angle of departure (AOD) ranging method. Alternatively, the night watch device may further determine a distance from each nursing device to the night watch device based on received signal strength of each nursing device.

Figure 9:
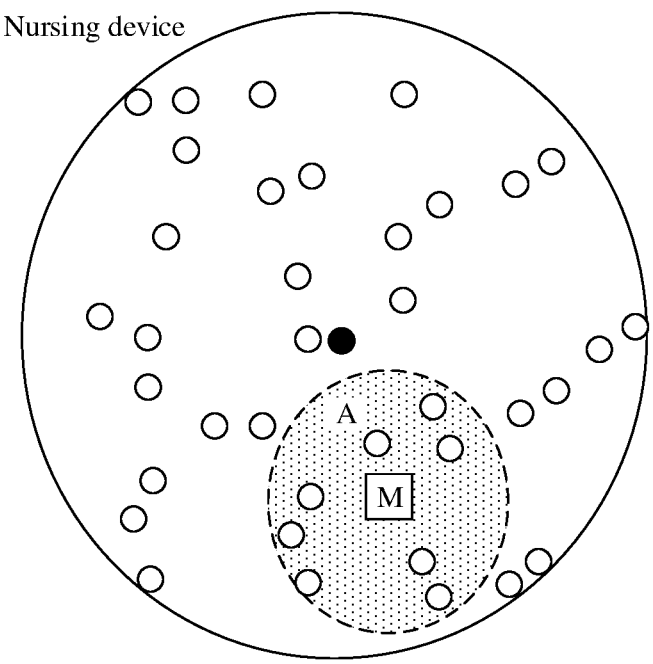
FIG. 9 is a schematic diagram of a wake-up area corresponding to a terminal according to an embodiment of this application.

Optionally, when the night watch device can determine the position (including a distance and a direction) of the terminal relative to the night watch device, the night watch device may determine, as the target night watch device, a night watch device whose distance from the terminal is less than a distance threshold. For example, FIG. 9 is a schematic diagram of a wake-up area corresponding to a terminal according to an embodiment of this application. As shown in FIG. 9, after determining a position of the terminal M, the night watch device determines a wake-up area A corresponding to the terminal M, and sends the wake-up notification to all nursing devices in the wake-up area A.

In this embodiment, the night watch device implements, based on the received signal strength of the terminal, hierarchical wake-up of the nursing devices managed by the night watch device, to avoid waking up all the nursing devices managed by the night watch device, thereby implementing refined energy saving control.

Step 702: When the nursing device receives the wake-up notification sent by the night watch device configured to manage the nursing device, the nursing device enters a wake-up state or a shallow sleep state.

Optionally, the nursing device may be managed by one or more night watch devices. When the nursing device receives a wake-up notification sent by any night watch device configured to manage the nursing device, the nursing device enters the wake-up state or the shallow sleep state. For example, when the AP shown in FIG. 5 is in a deep sleep state, if a radio frequency circuit of the AP receives the wake-up notification sent by the night watch device, the radio frequency circuit notifies a power supply to supply power to all or some other components of the AP, so that the AP enters the wake-up state or the shallow sleep state. When the wake-up notification carries the probe request frame, the nursing device enters the wake-up state, parses the wake-up notification to obtain the probe request frame, and further determines, based on a status of the nursing device, whether to return a probe response frame to the terminal that sends the probe request frame.

Optionally, when the nursing device in the shallow sleep state receives the wireless packet sent by the terminal, the nursing device enters the wake-up state.

Optionally, after the nursing device enters the wake-up state, when the nursing device has an associated terminal, the nursing device may further send a roaming monitoring notification to a neighbor nursing device. The roaming monitoring notification is used to indicate the nursing device to establish a roaming monitoring relationship with the neighbor nursing device, and a nursing device that establishes the roaming monitoring relationship with another nursing device is in a roaming monitoring state or the wake-up state. In this embodiment of this application, a device in the roaming monitoring state does not enter the deep sleep state, and the roaming monitoring state may be the shallow sleep state or the wake-up state.

In this embodiment of this application, when the nursing device has the associated terminal, the nursing device sends the roaming monitoring notification to the neighbor nursing device. If the neighbor nursing device in the deep sleep state receives the roaming monitoring notification, the neighbor nursing device enters the roaming monitoring state. If the neighbor nursing device in the wake-up state or the roaming monitoring state receives the roaming monitoring notification, the neighbor nursing device ignores the roaming monitoring notification, that is, does not process the roaming monitoring notification. Because all nursing devices that receive the roaming monitoring notification are in the roaming monitoring state or the wake-up state, a quick response to a roaming request of the terminal can be implemented.

Optionally, the nursing device that has the associated terminal may send the roaming monitoring notification to a neighbor nursing device whose received signal strength is higher than a specified signal strength threshold. The signal strength threshold may be set based on device deployment density in the wireless network. The signal strength threshold is positively correlated to the device deployment density in the wireless network. To be specific, higher device deployment density in the wireless network indicates a larger specified signal strength threshold. For example, when the device deployment density is relatively high, the signal strength threshold may be set to −50 dBm. When the device deployment density is relatively low, the signal strength threshold may be set to −70 dBm. In this embodiment of this application, different signal strength thresholds are set based on different device deployment scenarios of the wireless network, so that the refined energy saving control can be implemented.

Optionally, after that the nursing device sends the roaming monitoring notification to the neighbor nursing device, when duration in which the nursing device has no associated terminal reaches preset duration, the nursing device may further send a roaming monitoring termination notification to the neighbor nursing device. The roaming monitoring termination notification is used to indicate the neighbor nursing device to terminate the roaming monitoring relationship with the nursing device.

In this embodiment of this application, when the nursing device in the deep sleep state receives a roaming monitoring notification sent by a neighbor nursing device, the nursing device enters a roaming monitoring state, and establishes a roaming monitoring relationship with the neighbor nursing device. When the nursing device in the roaming monitoring state receives a roaming request sent by a terminal, the nursing device enters a wake-up state, and responds to the roaming request sent by the terminal. When the nursing device in the roaming monitoring state receives a roaming monitoring termination notification sent by the neighbor nursing device, the nursing device terminates the roaming monitoring relationship with the neighbor nursing device. After that the nursing device terminates the roaming monitoring relationship with the neighbor nursing device, when no roaming monitoring relationship is established between the nursing device and any neighbor nursing devices, the nursing device enters the deep sleep state.

Optionally, when the nursing device has the associated terminal, the nursing device may further send a wake-up response notification to the night watch device. The wake-up response notification carries an identifier of the associated terminal of the nursing device. After the night watch device determines, based on received wake-up response notifications sent by all nursing devices, that all terminals that have sent wireless packets to the night watch device are associated with corresponding nursing devices, the night watch device sends a sleep notification to the nursing device managed by the night watch device. The sleep notification is used to indicate a nursing device that is not associated with a terminal and that is not in the roaming monitoring state to enter the deep sleep state. To be specific, a nursing device that is in the wake-up state and that is not associated with a terminal enters the deep sleep state after receiving the sleep notification, and a nursing device that is in the wake-up state and that has an associated terminal or a nursing device in the roaming monitoring state ignores the received sleep notification.

Optionally, after the nursing device enters the wake-up state, when duration in which the nursing device is not associated with the terminal reaches preset duration, the nursing device automatically enters the deep sleep state. For example, after receiving the wake-up notification, the nursing device may start a sleep timer to perform timing. If receiving a new wake-up notification, the nursing device refreshes the sleep timer, so that the sleep timer recounts time. If the terminal is associated with the nursing device, the nursing device disables the sleep timer. After all associated terminals on the nursing device are disconnected from the nursing device, the nursing device enables the sleep timer again to start timing.

For example, in this embodiment of this application, the wireless network shown in FIG. 1 is used as an example, and schematic diagrams of device wake-up scenarios shown in FIG. 10 to FIG. 13 are used to describe an implementation process of the foregoing device wake-up method.

Figure 10:
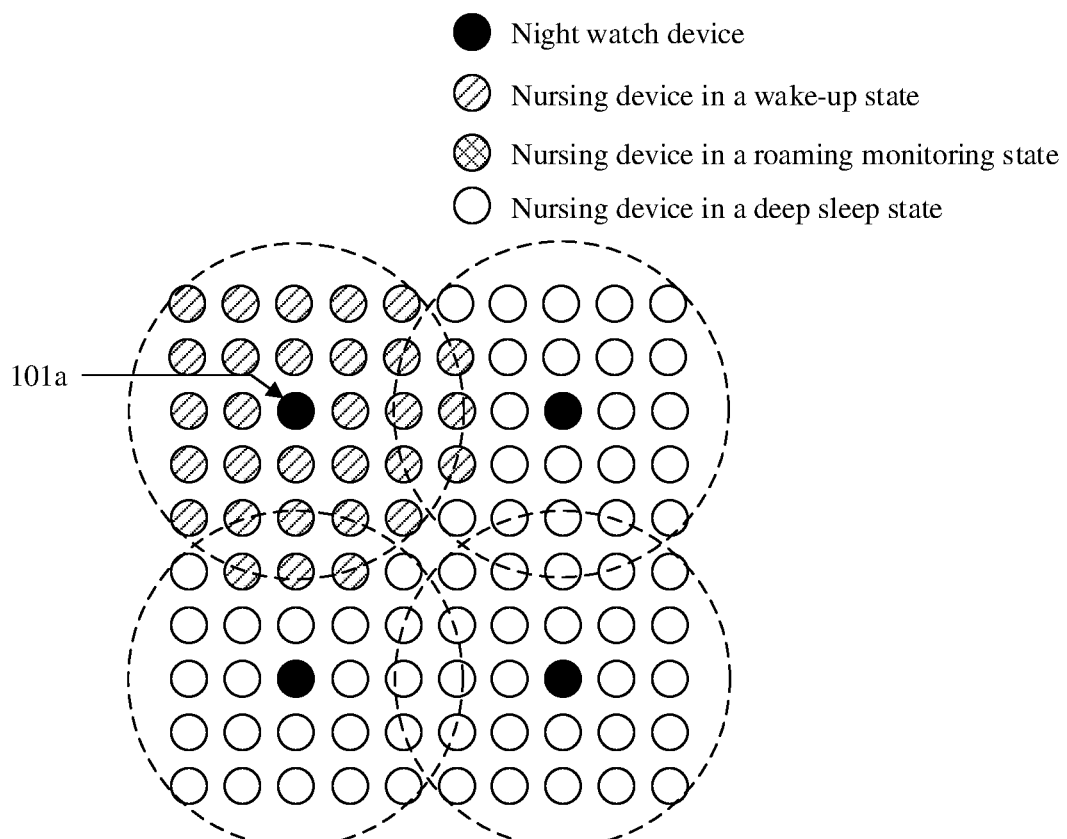
FIG. 10 is a schematic diagram of a device wake-up scenario in a wireless network according to an embodiment of this application.
Figure 11:
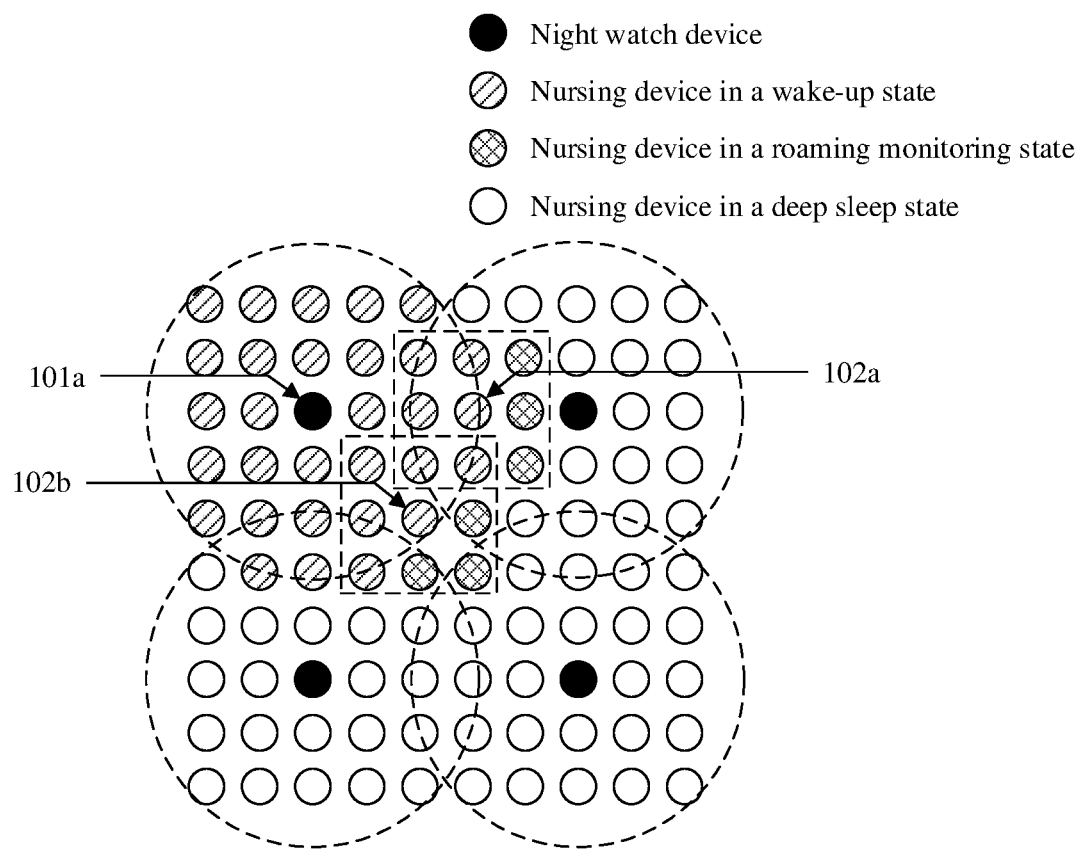
FIG. 11 is a schematic diagram of another device wake-up scenario in a wireless network according to an embodiment of this application.
Figure 12:
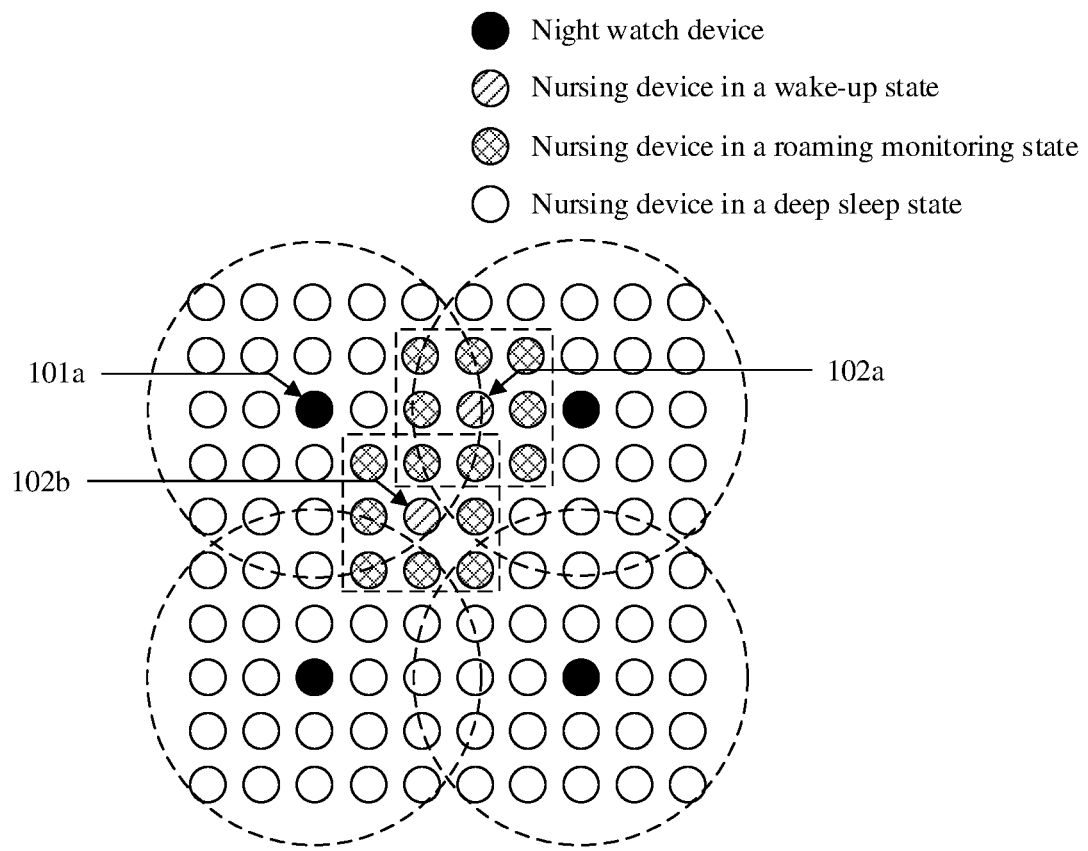
FIG. 12 is a schematic diagram of still another device wake-up scenario in a wireless network according to an embodiment of this application.
Figure 13:
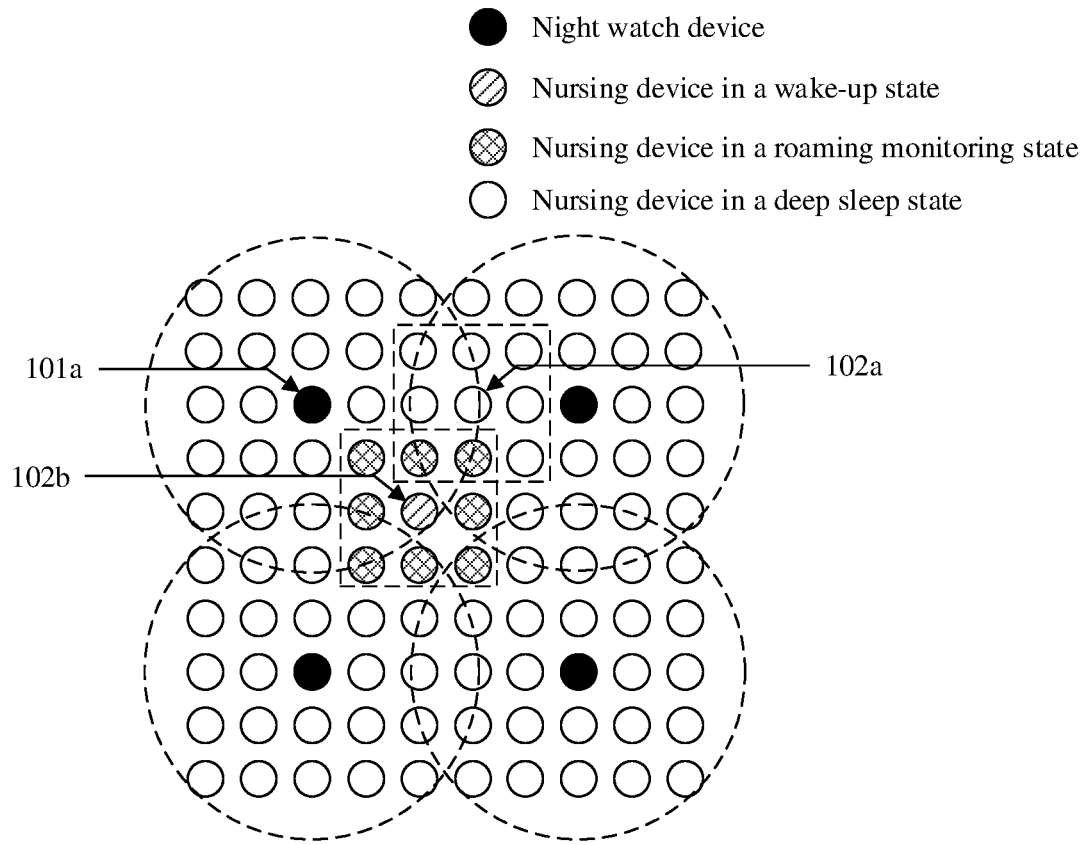
FIG. 13 is a schematic diagram of yet another device wake-up scenario in a wireless network according to an embodiment of this application.

The night watch device 101a receives the wireless packet sent by the terminal, and sends the wake-up notification to all nursing devices within a wireless coverage range of the night watch device 101a. Referring to FIG. 10, all the nursing devices enter the wake-up state. When the nursing device 102a and the nursing device 102b have associated terminals, the nursing device 102a and the nursing device 102b send roaming monitoring notifications to neighbor nursing devices. Referring to FIG. 11, all neighbor nursing devices of the nursing device 102a and the nursing device 102b are in the wake-up state or the roaming monitoring state. The night watch device 102a determines that all terminals that have sent wireless packets to the night watch device 102a are associated with nursing devices, and sends the sleep notification to a nursing device within the wireless coverage range. Referring to FIG. 12, a nursing device other than the nursing device 101a, the nursing device 102b, and the neighbor nursing devices of the nursing device 101a and the nursing device 102b enters the deep sleep state, and the neighbor nursing devices of the nursing device 101a and the nursing device 102b enter the roaming monitoring state. All associated terminals on the nursing device 102a are disconnected from the nursing device 102a, and the nursing device 102a sends the roaming monitoring termination notification to the neighbor nursing device. Referring to FIG. 13, the nursing device 102a and a neighbor nursing device that is other than the neighbor nursing device belonging to the nursing device 102b and that is in the neighbor nursing devices of the nursing device 102a enter the deep sleep state.

In conclusion, according to the device wake-up method provided in this application, the night watch device is disposed in the wireless network. When no terminal is connected to the wireless network, the night watch device is in the shallow sleep state or the wake-up state, and the nursing device is in the deep sleep state. Therefore, a relatively good energy saving effect of the wireless network is achieved. In addition, the night watch device is configured to listen to the wireless packet of the terminal, to determine whether the terminal intends to access the wireless network. When receiving the wireless packet sent by the terminal, the night watch device wakes up the nursing device in the deep sleep state through the wake-up notification, so that the nursing device enters the wake-up state or the shallow sleep state. Further, the nursing device can respond to an access request of the terminal promptly. Therefore, in this application, through collaboration of the night watch device and the nursing device, the nursing device in the deep sleep state can be woken up promptly, and the energy saving effect of the wireless network is ensured. This resolves a problem that currently, device energy saving and timely wake-up are not balanced.

Figure 14:
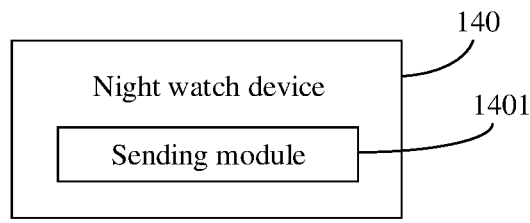
FIG. 14 is a schematic structural diagram of a night watch device according to an embodiment of this application.

FIG. 14 is a schematic structural diagram of a night watch device according to an embodiment of this application. A wireless network includes a plurality of night watch devices and a plurality of nursing devices. Each of the plurality of night watch devices is configured to manage one or more of the nursing devices. When no terminal is connected to the wireless network, the night watch device is in a shallow sleep state or a wake-up state, and the nursing device is in a deep sleep state. As shown in FIG. 14, the night watch device 140 includes a sending module 1401, configured to: when the night watch device that enables a night watch function receives a wireless packet sent by a terminal, send a wake-up notification to the nursing device managed by the night watch device.

Figure 15:
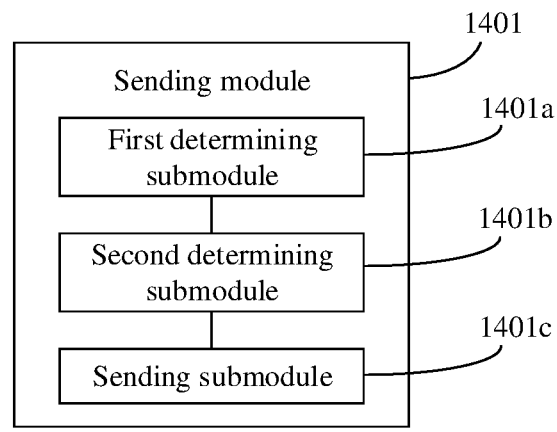
FIG. 15 is a schematic structural diagram of a sending module according to an embodiment of this application.

Optionally, as shown in FIG. 15, the sending module 1401 includes a first determining submodule 1401a, configured to determine received signal strength of the terminal based on the wireless packet, a second determining submodule 1401b, configured to determine, in the nursing device managed by the night watch device, a target nursing device corresponding to the received signal strength of the terminal, and a sending submodule 1401c, configured to send the wake-up notification to the target nursing device.

Optionally, the night watch device stores a correspondence between a received signal strength range and a wake-up range. The second determining submodule 1401b is configured to use, based on the correspondence and the received signal strength of the terminal, a nursing device in a wake-up range corresponding to the received signal strength of the terminal as the target nursing device.

Figure 16:
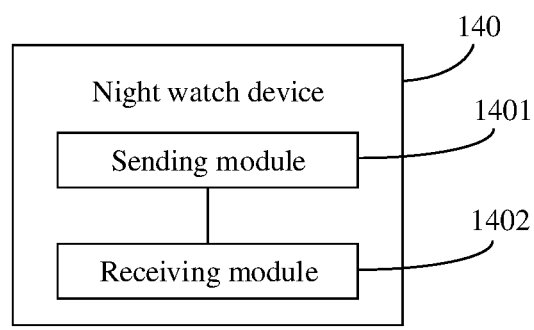
FIG. 16 is a schematic structural diagram of another night watch device according to an embodiment of this application.

Optionally, as shown in FIG. 16, the night watch device 140 further includes a receiving module 1402, configured to receive a wake-up response notification sent by a to-be-responded nursing device, where the wake-up response notification carries an identifier of an associated terminal of the to-be-responded nursing device, and the to-be-responded nursing device is a nursing device that receives the wake-up notification and that has an associated terminal, and the sending module 1401, further configured to: after the night watch device determines, based on a received wake-up response notification sent by one or more to-be-responded nursing devices, that all terminals that have sent wireless packets to the night watch device are associated with corresponding to-be-responded nursing devices, send a sleep notification to the nursing device managed by the night watch device, where the sleep notification is used to indicate a nursing device that is not associated with a terminal and that is not in a roaming monitoring state to enter the deep sleep state.

Optionally, the wireless network is a wireless local area network, and the wireless packet includes one or more of a probe request frame, an authentication request frame, an association request frame, or a reassociation request frame. Alternatively, the wireless network is a cellular network, and the wireless packet includes one or more of a random access preamble, a radio resource control connection request, an attach request, or a packet data network connectivity request.

Figure 17:
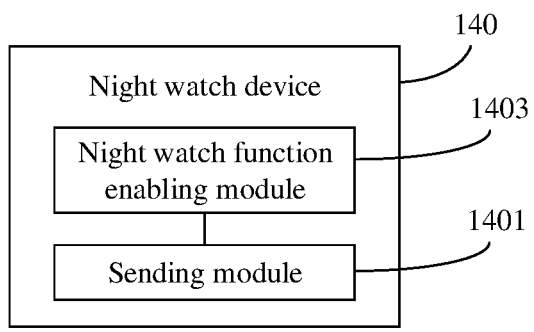
FIG. 17 is a schematic structural diagram of still another night watch device according to an embodiment of this application.

Optionally, as shown in FIG. 17, the night watch device 140 further includes a night watch function enabling module 1403, configured to: when any nursing device managed by the night watch device enters the deep sleep state, enable the night watch function.

In an optional embodiment, the night watch function enabling module 1403 is configured to: after receiving a pre-sleep notification sent by the any nursing device managed by the night watch device, enable the night watch function. The pre-sleep notification is used to indicate that the any nursing device enters the deep sleep state in a target time period.

In another optional embodiment, the night watch function enabling module 1403 is configured to: after receiving a night watch function enabling notification sent by a control device, enable the night watch function. The control device sends the night watch function enabling notification after receiving a pre-sleep notification sent by the any nursing device managed by the night watch device, and the pre-sleep notification is used to indicate that the any nursing device enters the deep sleep state in a target time period.

In conclusion, according to the night watch device provided in this embodiment of this application, the night watch device is always in the shallow sleep state or the wake-up state. When no terminal is connected to the wireless network, the nursing device is in the deep sleep state, so that a relatively good energy saving effect of the wireless network is achieved. The night watch device in the shallow sleep state or the wake-up state may listen to the wireless packet of the terminal, to determine whether the terminal intends to access the wireless network. When receiving the wireless packet sent by the terminal, the night watch device wakes up the nursing device in the deep sleep state through the wake-up notification, so that the nursing device enters the wake-up state or the shallow sleep state. Further, the nursing device can respond to an access request of the terminal promptly. Therefore, in this application, the night watch device is disposed in the wireless network, so that through collaboration of the night watch device and the nursing device, the nursing device in the deep sleep state can be woken up promptly, and the energy saving effect of the wireless network is ensured. This resolves a problem that currently, device energy saving and timely wake-up are not balanced.

Figure 18:
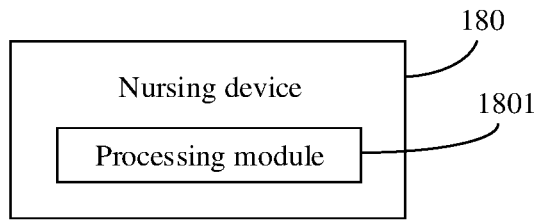
FIG. 18 is a schematic structural diagram of a nursing device according to an embodiment of this application.

FIG. 18 is a schematic structural diagram of a nursing device according to an embodiment of this application. A wireless network includes a plurality of night watch devices and a plurality of nursing devices. Each of the plurality of night watch devices is configured to manage one or more of the nursing devices. When no terminal is connected to the wireless network, the night watch device is in a shallow sleep state or a wake-up state, and the nursing device is in a deep sleep state. As shown in FIG. 18, the nursing device 180 includes a processing module 1801, configured to: when the nursing device receives a wake-up notification sent by the night watch device configured to manage the nursing device, enable the nursing device to enter the wake-up state or the shallow sleep state.

Optionally, the processing module 1801 is further configured to: when the nursing device in the shallow sleep state receives a wireless packet sent by a terminal, enable the nursing device to enter the wake-up state.

Figure 19:
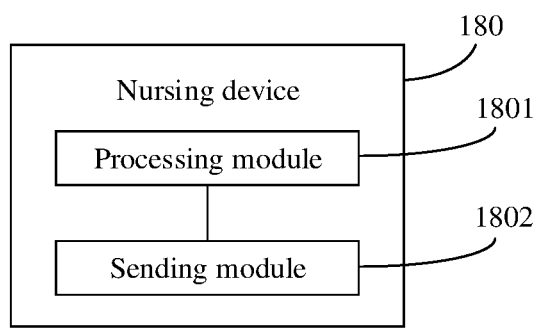
FIG. 19 is a schematic structural diagram of another nursing device according to an embodiment of this application.

Optionally, as shown in FIG. 19, the nursing device 180 further includes a sending module 1802, configured to: when the nursing device has an associated terminal, send a roaming monitoring notification to a neighbor nursing device, where the roaming monitoring notification is used to indicate the nursing device to establish a roaming monitoring relationship with the neighbor nursing device, and a nursing device that establishes the roaming monitoring relationship with another nursing device is in a roaming monitoring state or the wake-up state.

Optionally, the sending module 1802 is further configured to: when duration in which the nursing device has no associated terminal reaches preset duration, send a roaming monitoring termination notification to the neighbor nursing device. The roaming monitoring termination notification is used to indicate the neighbor nursing device to terminate the roaming monitoring relationship with the nursing device.

Optionally, the processing module 1801 is further configured to: when the nursing device in the deep sleep state receives a roaming monitoring notification sent by a neighbor nursing device, enable the nursing device to enter a roaming monitoring state, and to establish a roaming monitoring relationship with the neighbor nursing device. The processing module 1801 is further configured to: when the nursing device in the roaming monitoring state receives a roaming request sent by a terminal, enable the nursing device to enter the wake-up state, and to respond to the roaming request. The processing module 1801 is further configured to: when the nursing device in the roaming monitoring state receives a roaming monitoring termination notification sent by the neighbor nursing device, terminate a roaming monitoring relationship with the neighbor nursing device.

Optionally, the processing module 1801 is further configured to: when no roaming monitoring relationship is established between the nursing device and any neighbor nursing devices, enable the nursing device to enter the deep sleep state.

Optionally, the sending module 1802 is configured to: when the nursing device has an associated terminal, send a wake-up response notification to the night watch device that sends the wake-up notification. The wake-up response notification carries an identifier of the associated terminal of the nursing device.

In conclusion, according to the nursing device provided in this application, when no terminal is connected to the wireless network, the nursing device is in the deep sleep state, and the night watch device is in the shallow sleep state or the wake-up state, so that a relatively good energy saving effect of the wireless network is achieved. In addition, the night watch device is configured to listen to the wireless packet of the terminal, to determine whether the terminal intends to access the wireless network. When receiving the wireless packet sent by the terminal, the night watch device wakes up the nursing device in the deep sleep state through the wake-up notification, so that the nursing device enters the wake-up state or the shallow sleep state. Further, the nursing device can respond to an access request of the terminal promptly. Therefore, in this application, through collaboration of the night watch device and the nursing device, the nursing device in the deep sleep state can be woken up promptly, and the energy saving effect of the wireless network is ensured. This resolves a problem that currently, device energy saving and timely wake-up are not balanced.

Figure 20:
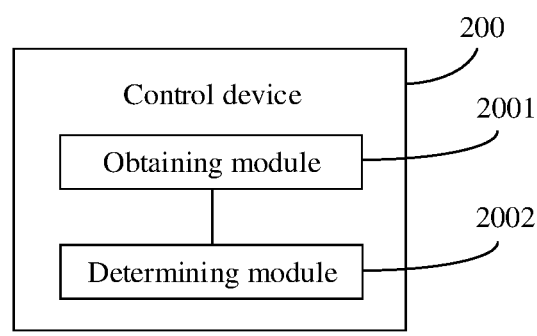
FIG. 20 is a schematic structural diagram of a control device according to an embodiment of this application.

FIG. 20 is a schematic structural diagram of a control device according to an embodiment of this application. As shown in FIG. 20, the control device 200 includes an obtaining module 2001, configured to obtain neighbor information of all devices in a wireless network, where the neighbor information of the device includes identifiers of all neighbor devices of the device, and the neighbor device of the device and the device have one or more same service set identifiers, and a determining module 2002, configured to determine the night watch device in the wireless network based on the neighbor information of all the devices in the wireless network, where a union set of all night watch devices in the wireless network and neighbor devices of all the night watch devices includes all the devices in the wireless network.

Optionally, the night watch devices include several devices that have largest quantities of neighbor devices in the wireless network. Alternatively, the night watch devices include several devices that have largest peak values of quantities of terminals historically accessing the wireless network, and the terminal that is of the device and that historically accesses the wireless network include a terminal associated with the device in a historical time period and/or a terminal that accesses the device in the historical time period.

In conclusion, according to the control device provided in this embodiment of this application, the night watch device in the wireless network is determined based on the neighbor information of all the devices in the wireless network, thereby implementing automatic selection of the night watch device in the wireless network. In addition, because all devices other than the night watch device in the wireless network are the nursing devices, all the devices in the wireless network can be woken up promptly. This can ensure working reliability of the devices while ensuring an energy saving effect of the devices.

An embodiment of this application further provides a device wake-up system. The device wake-up system includes a plurality of night watch devices 140 shown in FIG. 14, FIG. 16, or FIG. 17 in a wireless network, and a plurality of nursing devices 180 shown in FIG. 18 or FIG. 19 in the wireless network.

Optionally, in the device wake-up system shown in FIG. 3, the night watch device is configured to send, in a broadcast or multicast manner, a wake-up notification to the nursing device managed by the night watch device.

Optionally, in the device wake-up system shown in FIG. 4, the night watch device is configured to send the wake-up notification to a control device in a unicast manner through a wired network. The control device is configured to send, in the broadcast or multicast manner through the wired network, the wake-up notification to the nursing device managed by the night watch device.

Optionally, the control device is the control device shown in FIG. 20.

An embodiment of this application provides a night watch device. The night watch device includes a processor and a memory. The memory is configured to store computer programs, and the computer programs include program instructions. The processor is configured to invoke the computer programs to implement an action performed by the night watch device in the foregoing method embodiment.

Optionally, a structure of the night watch device may be shown in FIG. 5.

An embodiment of this application further provides a nursing device. The nursing device includes a processor and a memory. The memory is configured to store computer programs, and the computer programs include program instructions. The processor is configured to invoke the computer programs to implement an action performed by the nursing device in the foregoing method embodiment.

Optionally, a structure of the nursing device may be shown in FIG. 5.

Figure 21:
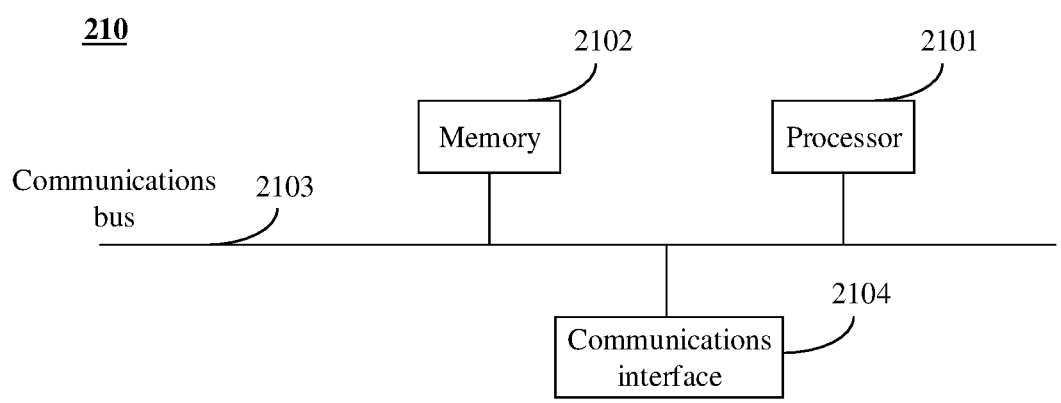
FIG. 21 is a block diagram of a control device according to an embodiment of this application.

FIG. 21 is a block diagram of a control device according to an embodiment of this application. As shown in FIG. 21, the control device 210 includes a processor 2101 and a memory 2102.

The memory 2102 is configured to store computer programs, and the computer programs include program instructions.

The processor 2101 is configured to invoke the computer programs to implement an action performed by the control device in the foregoing method embodiment.

Optionally, the management device 210 further includes a communications bus 2103 and a communications interface 2104.

The processor 2101 includes one or more processing cores, and the processor 2101 executes various function applications and data processing by running the computer programs.

The memory 2102 may be configured to store the computer programs. Optionally, the memory may store an operating system. The operating system may be an operating system, for example, a real-time operating system (Real Time eXecutive, RTX), LINUX, UNIX, WINDOWS, or OS X.

There may be a plurality of communications interfaces 2104, and the communications interface 2104 is configured to communicate with another device, for example, communicate with a night watch device and/or a nursing device.

The memory 2102 and the communications interface 2104 are separately connected to the processor 2101 through the communications bus 2103.

An embodiment of this application further provides a computer storage medium. The computer storage medium stores instructions. When the instructions are executed by a processor of a night watch device, an action performed by the night watch device in the foregoing method embodiment is implemented. Alternatively, when the instructions are executed by a processor of a nursing device, an action performed by the nursing device in the foregoing method embodiment is implemented. Alternatively, when the instructions are executed by a processor of a control device, an action performed by the control device in the foregoing method embodiment is implemented.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

In the embodiments of this application, the terms "first", "second", and "third" are merely used for a purpose of description, and shall not be understood as an indication or implication of relative importance. Unless otherwise explicitly limited, the term "at least one" refers to one or more, and the term "a plurality of" refers to two or more.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A device wake up method, comprising:
  sending, by a night watch device, in response to the night watch device receiving a wireless packet sent by a terminal, a wake-up notification to a nursing device managed by the night watch device;
  wherein the night watch device and the nursing device are non-terminal devices, and wherein the nursing device and the terminal are different from each other;
  wherein the night watch device implements a night watch function;

wherein a wireless network comprises a plurality of night watch devices that includes the night watch device, and wherein the wireless network further comprises a plurality of nursing devices that includes the nursing device;

wherein each night watch device of the plurality of night watch devices is configured to manage one or more nursing devices of the plurality of nursing devices; and wherein, when no terminal is connected to the wireless network, the night watch device is in a shallow sleep state or a wake-up state, and, when no terminal is connected to the wireless network, the nursing device is in a deep sleep state.

2. The method according to claim 1, wherein the sending the wake-up notification to the nursing device managed by the night watch device comprises:
   determining, by the night watch device, received signal strength of the terminal based on the wireless packet;
   determining, by the night watch device, a target nursing device corresponding to the received signal strength of the terminal; and
   sending, by the night watch device, the wake-up notification to the target nursing device.

3. The method according to claim 2, wherein the night watch device stores a correspondence between a received signal strength range and a wake-up range; and
   wherein the determining, by the night watch device, the target nursing device corresponding to the received signal strength of the terminal comprises:
      using, by the night watch device, based on the correspondence and the received signal strength of the terminal, the nursing device in the wake-up range corresponding to the received signal strength of the terminal as the target nursing device.

4. The method according to claim 1, further comprising:
   receiving, by the night watch device, a wake-up response notification sent by a to-be-responded nursing device, wherein the wake-up response notification carries an identifier of an associated terminal of the to-be-responded nursing device, and wherein the to-be-responded nursing device is a nursing device that receives the wake-up notification and that has the associated terminal; and
   sending, by the night watch device, a sleep notification to the nursing device managed by the night watch device after the night watch device determines, based on a received wake-up response notification sent by one or more to-be-responded nursing devices, that all terminals that have sent wireless packets to the night watch device are associated with corresponding to-be-responded nursing devices, wherein the sleep notification indicates a nursing device that is not associated with the terminal and that is not in a roaming monitoring state to enter the deep sleep state.

5. The method according to claim 1, wherein the wireless network is a wireless local area network, and the wireless packet comprises one or more of a probe request frame, an authentication request frame, an association request frame, or a reassociation request frame; or
   the wireless network is a cellular network, and the wireless packet comprises one or more of a random access preamble, a radio resource control connection request, an attach request, or a packet data network connectivity request.

6. The method according to claim 1, further comprising:
   enabling, by the night watch device, the night watch function in response to the nursing device managed by the night watch device entering the deep sleep state.

7. The method according to claim 6, wherein the enabling the night watch function comprises:
   enabling, by the night watch device, the night watch function after receiving a pre-sleep notification sent by the nursing device managed by the night watch device, wherein the pre-sleep notification indicates that the nursing device enters the deep sleep state in a target time period.

8. The method according to claim 6, wherein the enabling the night watch function comprises:
   enabling, by the night watch device, the night watch function after receiving a night watch function enabling notification sent by a control device, wherein the control device sends the night watch function enabling notification after receiving a pre-sleep notification sent by the nursing device managed by the night watch device, and wherein the pre-sleep notification indicates that the nursing device managed by the night watch device enters the deep sleep state in a target time period.

9. The method of claim 1, wherein the night watch device and the nursing device are base stations, and wherein the nursing device and the terminal are different types of devices.

10. A method, comprising:
    entering, by a nursing device, a wake-up state or a shallow sleep state in response to the nursing device receiving a wake-up notification sent by a night watch device that is configured to manage the nursing device;
    wherein the night watch device and the nursing device are non-terminal devices, and wherein the nursing device and a terminal are different from each other;
    wherein a wireless network comprises a plurality of night watch devices that includes the night watch device, wherein the wireless network further comprises a plurality of nursing devices including the nursing device;
    wherein each night watch device of the plurality of night watch devices is configured to manage one or more nursing devices of the plurality of nursing devices; and
    wherein, when no terminal is connected to the wireless network, the night watch device is in the shallow sleep state or the wake-up state, and, when no terminal is connected to the wireless network, the nursing device is in a deep sleep state.

11. The method according to claim 10, further comprising performing, after the entering, by the nursing device, the shallow sleep state:
    entering, by the nursing device, the wake-up state in response to the nursing device receiving a wireless packet sent by the terminal.

12. The method according to claim 10, further comprising performing, after the entering, by the nursing device, the wake-up state:
    sending, by the nursing device, a roaming monitoring notification to a neighbor nursing device in response to the nursing device having an associated terminal, wherein the roaming monitoring notification indicates to the nursing device to establish a roaming monitoring relationship with the neighbor nursing device, and wherein a nursing device that establishes the roaming monitoring relationship with another nursing device is in a roaming monitoring state or the wake-up state.

13. The method according to claim 12, further comprising performing, after the sending, by the nursing device, the roaming monitoring notification to the neighbor nursing device:
- sending, by the nursing device, a roaming monitoring termination notification to the neighbor nursing device in response to a duration in which the nursing device has no associated terminal reaches a preset duration, wherein the roaming monitoring termination notification indicates to the neighbor nursing device to terminate the roaming monitoring relationship with the nursing device.

14. The method according to claim 10, further comprising:
- performing, in response to the nursing device in the deep sleep state receiving a roaming monitoring notification sent by a neighbor nursing device:
  - entering, by the nursing device, a roaming monitoring state; and
  - establishing a roaming monitoring relationship with the neighbor nursing device;
- performing, in response to the nursing device in the roaming monitoring state receiving a roaming request sent by the terminal:
  - entering, by the nursing device, the wake-up state; and
  - responding to the roaming request; and
- performing, in response to the nursing device in the roaming monitoring state receiving a roaming monitoring termination notification sent by the neighbor nursing device:
  - terminating, by the nursing device, the roaming monitoring relationship with the neighbor nursing device.

15. The method according to claim 14, further comprising performing, after the terminating the roaming monitoring relationship with the neighbor nursing device:
- entering, by the nursing device, the deep sleep state in response to no roaming monitoring relationship being established between the nursing device and any neighbor nursing devices.

16. The method according to claim 10, further comprising performing, after the entering, by the nursing device, the wake-up state:
- sending, by the nursing device, in response to the nursing device having an associated terminal, a wake-up response notification to the night watch device that sends the wake-up notification, wherein the wake-up response notification carries an identifier of the associated terminal of the nursing device.

17. A night watch device, comprising:
a processor; and
a non-transitory computer readable memory storing a program for execution by the processor, the program including instructions for:
- sending, by the night watch device, a wake-up notification to a nursing device managed by the night watch device, when the night watch device that enables a night watch function receives a wireless packet sent by a terminal;
wherein the night watch device and the nursing device are non-terminal devices, and wherein the nursing device and the terminal are different from each other;
wherein the night watch device is in a plurality of night watch devices, and wherein a wireless network comprises the plurality of night watch devices and a plurality of nursing devices;
wherein each night watch device of the plurality of night watch devices is configured to manage one or more nursing devices of the plurality of nursing devices; and
wherein, when no terminal is connected to the wireless network, the night watch device is in a shallow sleep state or a wake-up state, and wherein when no terminal is connected to the wireless network, the nursing device is in a deep sleep state.

18. A nursing device, comprising:
a processor; and
a non-transitory computer readable memory storing a program for execution by the processor, the program including instructions for:
- entering, by the nursing device, a wake-up state or a shallow sleep state in response to the nursing device receiving a wake-up notification sent by a night watch device that is configured to manage the nursing device;
wherein the night watch device and the nursing device are non-terminal devices, and wherein the nursing device and a terminal are different from each other;
wherein the night watch device is in a plurality of night watch devices, and wherein a wireless network comprises the plurality of night watch devices and a plurality of nursing devices;
wherein each night watch device of the plurality of night watch devices is configured to manage one or more nursing devices of the plurality of nursing devices; and
wherein, when no terminal is connected to the wireless network, the night watch device is in the shallow sleep state or the wake-up state, and wherein when no terminal is connected to the wireless network, the nursing device is in a deep sleep state.

* * * * *

UNITED STATES PATENT AND TRADEMARK OFFICE
CERTIFICATE OF CORRECTION

PATENT NO. : 12,170,957 B2
APPLICATION NO. : 17/671985
DATED : December 17, 2024
INVENTOR(S) : Zhengquan Huang Page 1 of 1

It is certified that error appears in the above-identified patent and that said Letters Patent is hereby corrected as shown below:

In the Claims

In Column 28, in Claim 1, Line 58, after "A" delete "device wake up".

Signed and Sealed this
Eleventh Day of February, 2025

Coke Morgan Stewart
*Acting Director of the United States Patent and Trademark Office*